US009171165B2

(12) United States Patent
Efraim et al.

(10) Patent No.: US 9,171,165 B2
(45) Date of Patent: Oct. 27, 2015

(54) METHODS, SYSTEMS, AND APPARATUSES TO FACILITATE CONFIGURATION OF A HARDWARE DEVICE IN A PLATFORM

(75) Inventors: Rotem Efraim, Haifa (IL); Ronny Korner, Haifa (IL); Doron Rajwan, Rishon Le-Zion (IL)

(73) Assignee: Intel Corporation, Santa Clara, CA (US)

( * ) Notice: Subject to any disclaimer, the term of this patent is extended or adjusted under 35 U.S.C. 154(b) by 1112 days.

(21) Appl. No.: 12/646,903

(22) Filed: Dec. 23, 2009

(65) Prior Publication Data

US 2011/0154011 A1 Jun. 23, 2011

(51) Int. Cl.
*G06F 21/57* (2013.01)
*G06F 21/64* (2013.01)
*G06F 15/177* (2006.01)

(52) U.S. Cl.
CPC .............. *G06F 21/572* (2013.01); *G06F 21/64* (2013.01); *G06F 15/177* (2013.01)

(58) Field of Classification Search
CPC ......... G06F 21/57; G06F 21/62; G06F 21/64; G06F 15/177
USPC .......................................................... 713/100
See application file for complete search history.

(56) References Cited

U.S. PATENT DOCUMENTS

| | | | |
|---|---|---|---|
| 2003/0233524 A1* | 12/2003 | Poisner | 711/156 |
| 2004/0005876 A1* | 1/2004 | Tuoriniemi | 455/411 |
| 2004/0015694 A1* | 1/2004 | DeTreville | 713/172 |
| 2004/0017724 A1* | 1/2004 | Kubota et al. | 365/222 |
| 2005/0014559 A1* | 1/2005 | Mattice et al. | 463/29 |
| 2005/0091516 A1* | 4/2005 | Mcdermott | 713/189 |
| 2005/0278666 A1* | 12/2005 | Diamond | 716/4 |
| 2006/0136747 A1* | 6/2006 | Ahdout et al. | 713/189 |
| 2006/0212609 A1* | 9/2006 | Zimmer et al. | 710/14 |
| 2006/0272022 A1* | 11/2006 | Loukianov et al. | 726/26 |
| 2007/0038852 A1* | 2/2007 | Bovino et al. | 713/1 |
| 2007/0226482 A1* | 9/2007 | Borkar et al. | 713/100 |
| 2009/0296511 A1* | 12/2009 | Henry et al. | 365/225.7 |

OTHER PUBLICATIONS

"Advanced Configuration and Power Interface", wikipedia.org/.../Advanced_Confi . . . , Jul. 12, 2009, pp. 1-5.
Simcha Gochman, et al., "Introduction to Intel Core Duo Processor Architecture", Intel Technology Journal, vol. 10, Issue 2, 2006, pp. 92-97.
Avi Mendelson, et al., "CMP Implementation in Systems Based on the Intel Core Duo Processor", Intel Technology Journal, vol. 10, Issue 2, 2006, pp. 99-107.

(Continued)

*Primary Examiner* — Zahid Choudhury
*Assistant Examiner* — Brandon Kinsey
(74) *Attorney, Agent, or Firm* — Nicholson De Vos Webster & Elliott LLP

(57) ABSTRACT

Embodiments of methods, systems, and apparatuses for configuring a hardware device in a platform are described. In an exemplary method, a configuration message is received that indicates that the hardware device is to be upgraded from a first configuration to a second configuration, wherein the first and second configurations were pre-determined based on previous testing of the hardware device and are stored in the hardware device. The hardware device is then configured to the second configuration.

15 Claims, 25 Drawing Sheets

(56) References Cited

OTHER PUBLICATIONS

Alon Naveh, et al. "Power and Thermal Management in the Intel Core Duo Processor", Intel Technology Journal, vol. 10, Issue 2, 2006, pp. 109-122.

Jayesh Iyer, et al., "System Memory Power and Thermal Management in Platforms Built on Intel Centrino Duo Mobile Technology", Intel Technology Journal, vol. 10, Issue 2, 2006, pp. 123-132.

Suresh Subramanyam, et al., "Intel 945GMS Express Chipset for Small Form Factor Platform Based on Intel Centrino Duo Mobile Technology", Intel Technology Journal, vol. 10, Issue 2, 2006, pp. 133-145.

Mark Ruberto, et al., "WLAN System, HW, and Fric Architecture for the Intel Pro/Wireless 3945 ABG Network Connection", Intel Technology Journal, vol. 10, Issue 2, 2006, pp. 147-156.

Ilan Hen, "MIMO Architecture for Wireless Communication", Intel Technology Journal, vol. 10, Issue 2, 2006, pp. 157-165.

* cited by examiner

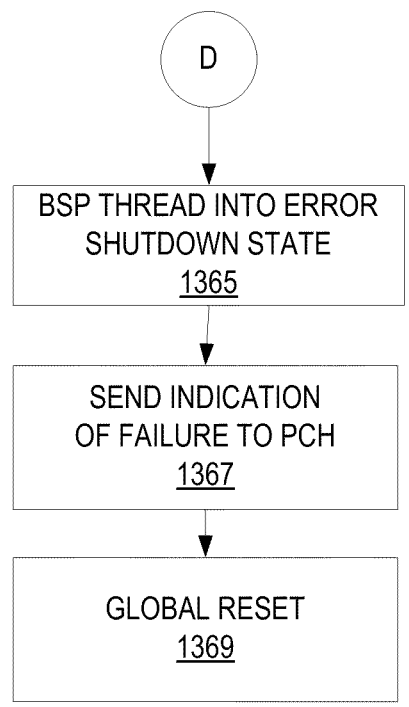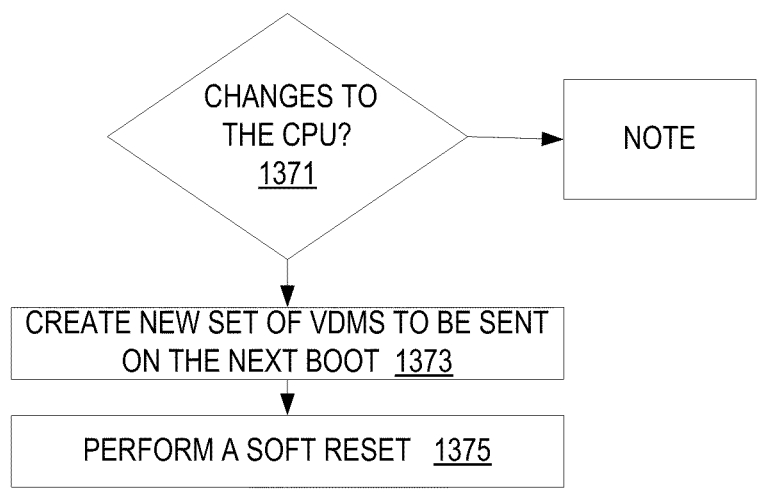
FIG. 13(d)

METHODS, SYSTEMS, AND APPARATUSES TO FACILITATE CONFIGURATION OF A HARDWARE DEVICE IN A PLATFORM

FIELD OF THE INVENTION

This invention relates to a platform, and more specifically but not exclusively, to facilitate configuration of a configurable feature of a hardware device in the platform.

BACKGROUND DESCRIPTION

Computer platforms often have a pre-defined configuration for its hardware devices that is fixed at the point of deployment. A hardware device may have certain feature such as clock speed, bus width, or other characteristic that differentiates itself from another version of the hardware device. The configuration of the hardware devices in the computer platform typically cannot be changed without replacing the existing hardware module.

For example, a computer platform may have a Intel® Core™ Duo processor with a clock speed of 1.73 gigahertz (Ghz). If an user desires to upgrade the clock speed of the current processor from 1.73 Ghz to 2.33 Ghz or to add the feature of Intel® Virtualization Technology (Intel® VT), the user would have to replace the current processor of the platform by an Intel® Core™ Duo processor with clock speed of 2.33 Ghz and with Intel® VT feature enabled.

There are no avenues currently that allow a secure configuration of the configurable features in a hardware device in a platform.

BRIEF DESCRIPTION OF THE DRAWINGS

The features and advantages of embodiments of the invention will become apparent from the following detailed description of the subject matter in which.

DETAILED DESCRIPTION

Reference in the specification to "one embodiment" or "an embodiment" of the invention means that a particular feature, structure or characteristic described in connection with the embodiment is included in at least one embodiment of the invention. Thus, the appearances of the phrase "in one embodiment" appearing in various places throughout the specification are not necessarily all referring to the same embodiment.

Embodiments of the inventions provide a method and system to allow the secure configuration of the configurable feature(s) of a hardware device in a platform.

Typically, hardware manufactures make individual products and sell them with preset abilities and configurations. When the manufactures test their chips they guarantee a maximum operating frequency at a specific voltage. These manufactures make and sell CPUs that are marked as having a particular maximum operating frequency and line items (such as the number of cores enabled) based on how each CPU performs when tested and current market conditions. Unfortunately, some of these products are marked and sold as lower performing parts even though they are capable of performing at a higher rate. For example, while a CPU may be manufactured with four cores and supports a maximum operating frequency of 2.80 GHz, it may be marked to only having two cores available to the user and the top operating frequency of 2.66 GHz. Described below are embodiments of systems, methods, and apparatuses that support the field upgradability of binned parts.

Each hardware device, such as a CPU, has a Thermal Design Power (TDP) envelope that specifies the maximum power that may be generated before there is failure. A processor's generated power is directly proportional to the frequency and the square of the voltage.

The Advanced Configuration and Power Interface (ACPI) specification allows for the use of several different performance states (P-states) while a processor is operating. Each p-state is a frequency and voltage operating point and both are scaled as the p-state increases. When a device is ACPI's P0 p-state it uses its maximum performance capability and may consume the maximum amount of power allowed. In this state, a device operates at or near its full allowed capability. In the P1 p-state, the performance capability of the device is limited below its maximum and consumes less than maximum power. The p-state Pn is the minimum frequency level and consumes minimal power while remaining in an active state.

Figure 6:
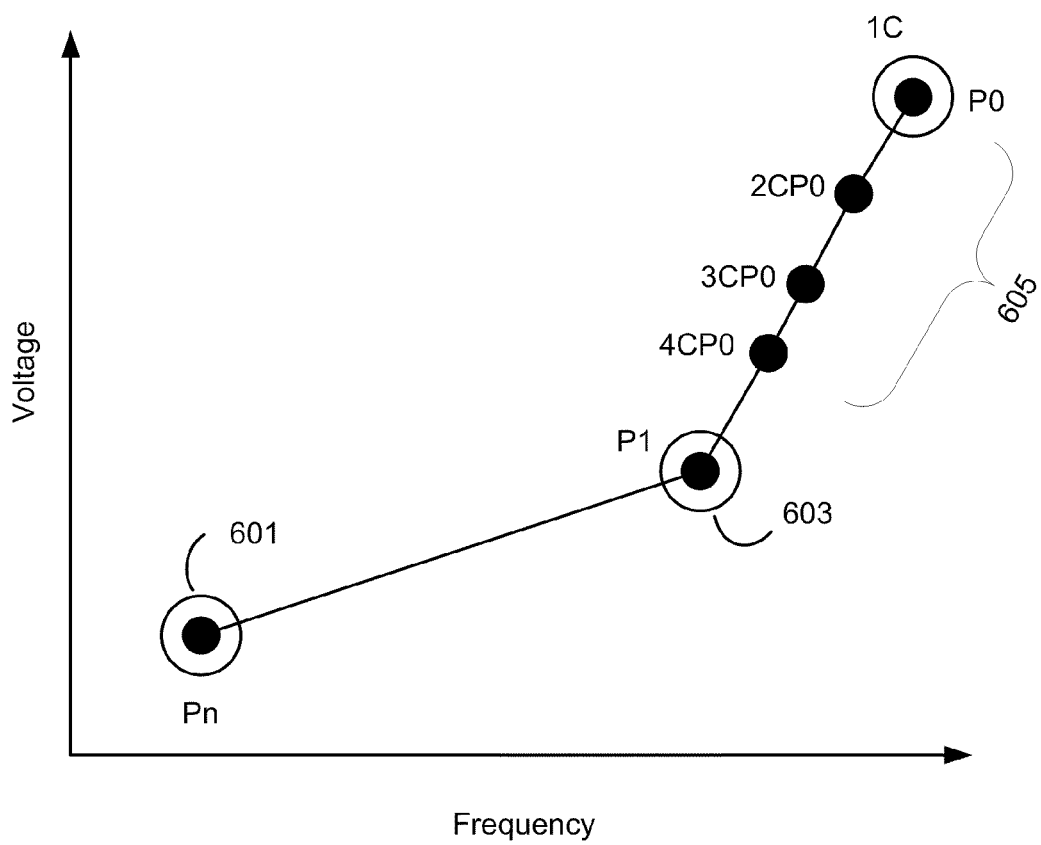
FIGS. 6-7 illustrate P-states of processors.

FIG. 6 shows an exemplary range of many potential P-states of a CPU as it has been configured by the manufacturer. FIG. 6 shows three P-states, but this number may be higher or lower. The Pn P-state 610 is the lowest frequency and voltage point of the processor. This particular CPU has four cores and at this P-state each core operates at the same voltage and frequency when active. In some embodiments, a core is considered active it is in the ACPI "C0" or "C1" state.

The next P-state illustrated is P1 603. P1 represents the frequency that the CPU was marked as supporting when it was sold. The CPU was tested and passed at this P-state. Note that has the P-states increase in terms of frequency and voltage that the power consumed and temperate of the CPU increase. However, each P-state illustrated will not go beyond the TDP of the CPU.

The P0 state is shown with four separate points 605. The first point after P1 is labeled "4CP0" and at this point four cores (4C) are active. The next P0 state is "3CP0" and at this point three cores are active. However, the frequency of each core has increased at this state. This is because TDP applies to the processor as a whole and processors with more cores operate at lower voltage and frequency points per core than processors with fewer cores to ensure the combined power dissipated from all cores does not exceed the processor's TDP. This trend continues to through the P0 states until only one core is operating.

In the example of FIG. 6, the P0 states allow the cores to run faster than the marked frequency if the part is operating under power, temperature, and current specifications limits of the TDP. However, in other embodiments, the CPU is marked being capable of operating at one of the P0 states instead of being marked as P1's frequency.

Embodiments of the invention provide a method and system to allow the secure configuration of the configurable feature(s) of a hardware device in a platform.

Figure 1:
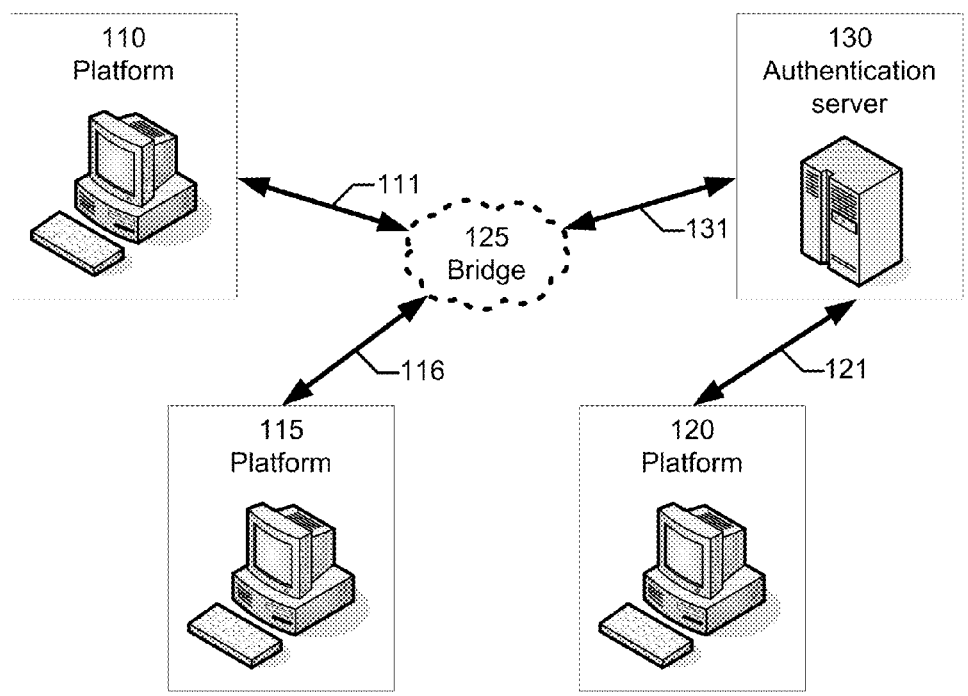
FIG. 1 illustrates a network where several platforms communicate with an authentication server in accordance with one embodiment of the invention.

FIG. 1 illustrates a network 100 where platforms 110, 115 and 120 communicate with an authentication server (or license server) 130 in accordance with some embodiments of the invention. In some OEM scenarios discussed below, the license server 130 is local to the OEM and may be called an authentication appliance. The platforms 110, 115 and 120 each have a hardware device(s) with configurable feature(s). The platform includes, but is not limited to, a desktop computer, a laptop computer, a notebook computer, a personal digital assistant (PDA), a server, a workstation, a cellular telephone, a mobile computing device, an Internet appliance or any other type of computing device. The hardware device includes, but is not limited to, a central processing unit (CPU), a chipset, or any other hardware device that can be designed with a configurable feature(s). The configurable feature of a hardware device includes, but is not limited to, the maximum operating clock frequency, the bus operating speed, the cache size, the cache speed, the power consumption, the security feature, the encryption scheme, or any other characteristic or function of the hardware device.

In FIG. 1, the platforms 110, and 115 are connected with authentication server 130 via a bridge 125. The bridge 125 includes, but is not limited to, an access point, a router, the Internet, a switch or any device capable of enabling communication between the platforms 110, and 115 and the authentication server 130. In other embodiments, the bridge 125 is optional. For example, the platform 120 can be connected directly with the authentication server 130 without the bridge 125. Communication links 111, 116, 121, 131 include, but are not limited to, Ultra Wide Band (UWB), Wireless fidelity (WiFi), Home Plug Audio Video (HPAV), Bluetooth, Ethernet, optical fiber and any wired or wireless means of communication between the authentication server 130 and the platforms 110, 115, and 120.

Although only three platforms 110, 115, and 120 are depicted as connected with the authentication server 130, it is not meant to be limiting and more than three platforms can be connected with the authentication server 130. In addition, the three platforms 110, 115, and 120 can be connected with more than one authentication server and can also be connected with different authentication servers. In other embodiments, the authentication server 130 may be a part of the platforms 110, 115, and 120.

Figure 2:
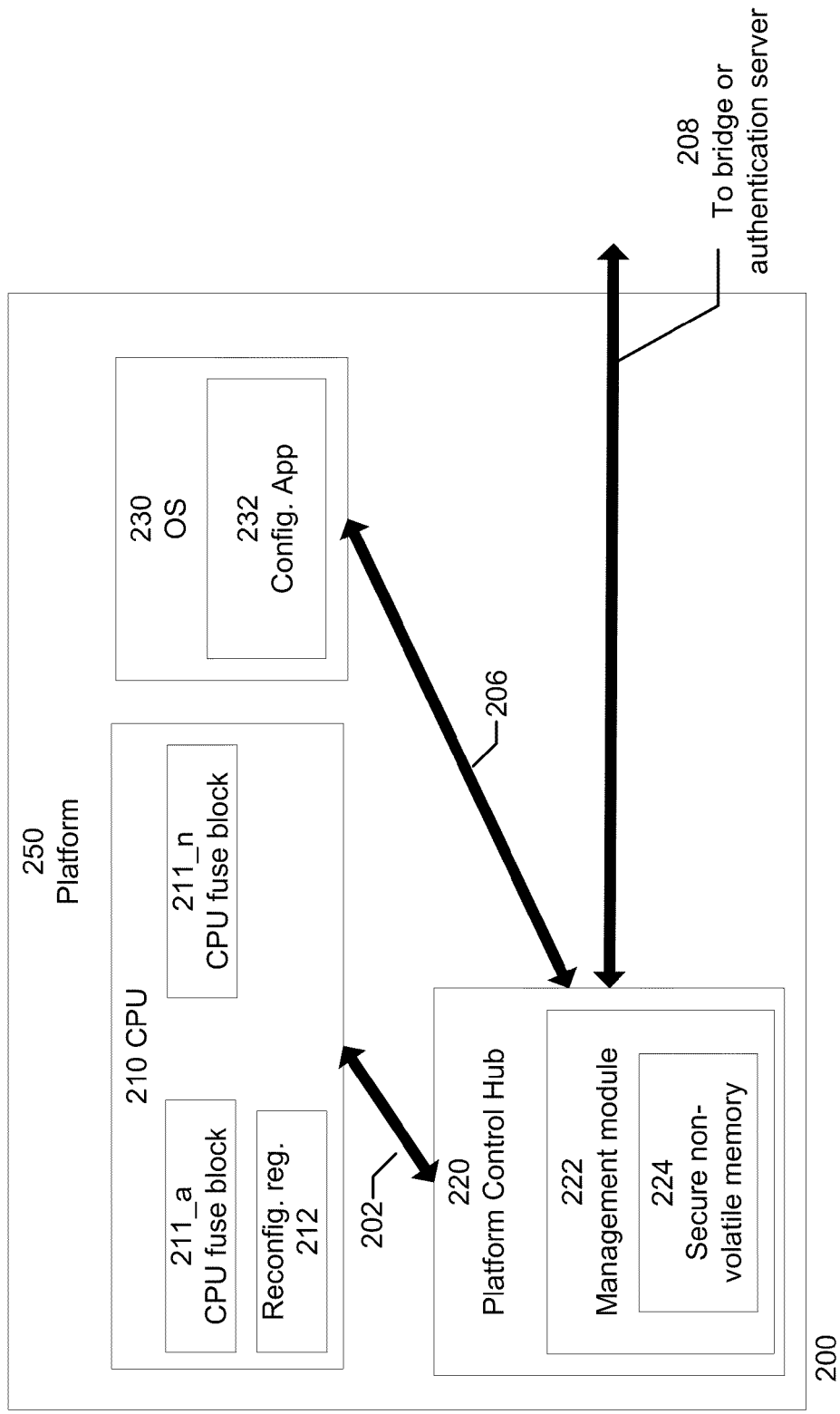
FIG. 2 illustrates a platform configuration according to one embodiment of the invention.

FIG. 2 illustrates a platform configuration 200 according to one embodiment of the invention. The platform 250 has three modules, namely, the CPU 210, the operating system (OS) 230, and the platform control hub (PCH) 220. The CPU 210 has a CPU fuse block 211 and a CPU reconfiguration register 212. In some embodiment, a reconfiguration consists of several different values that may be reconfigured. The CPU fuse block 211 has hardware fuses that determine the configuration of the configurable feature(s) of the CPU 210. In one embodiment, the CPU fuse block 211 is preset with a default value that determines the configuration of the configurable feature(s) of the CPU 210. For example, when CPU 210 is manufactured, it may have the capability to support clock speeds of 1.73 GHz or 2.33 GHz. The configuration of the clock speed can be preset in the CPU fuse block 211 to support 1.73 GHz.

The CPU reconfiguration register 212 enables firmware executing in the CPU 210 to reconfigure the setting of the CPU fuse block 211. When the CPU 210 reconfigures the settings of the CPU fuse block 211 with the contents of the CPU reconfiguration register 212, the configurable feature(s) is enabled or disabled based on the settings of the CPU reconfiguration register 212. In one embodiment, the CPU reconfiguration register 212 can only be written once. In another embodiment, the CPU reconfiguration register 212 is locked after it is written and cannot be changed by the operating system 230 until the CPU 210 gets a new request to update the CPU reconfiguration register 212. The CPU reconfiguration register 212 is not reset by a reset of the platform 250 and its contents are not erased by the reset. In some embodiments, the CPU reconfiguration register 212 is not accessible by the OS 230.

In one embodiment, a logical exclusive OR (XOR) operation is performed on the contents in the CPU reconfiguration register 212 with the contents of the CPU fuse block 211. The result of the XOR operation is routed to the functional block of the configurable feature(s) of the CPU 210 to enable or disable the feature.

The CPU 210 is connected with the PCH 220. The PCH 220 has a management module (MM) 222 that communicates with the authentication server 130 via communication link 208. In some embodiments, the MM 222 is chipset firmware. In one embodiment, the MM 222 receives a permit to authorize the configuration of the configurable feature(s) of the CPU 210 from the authentication server 130. The permit is a binary data file that contains information about the CPU 210 and the configuration settings of each configurable feature(s) of the CPU 210. The permit is digitally signed to ensure that the permit has not been modified. The MM 222 stores the permit in a secure non-volatile memory 224 that is not accessible by the OS 230 or any other firmware of the platform. The secure non-volatile memory 224 is tamper-proof and it includes, but is not limited to, secure flash memory, read only memory (ROM), or any other type of secure memory that retains its data when powered off. The communication link 202 between the CPU 210 and PCH 220 is a hardwire connection and is also not accessible by the OS 230.

The third module of the platform 250 is the OS 230. A configuration application 232 executes in the OS 230 to initiate the MM 222 to communicate with the authentication server 130 to obtain the permit. The configuration application 232 communicates with the MM 222 via communication link 206. Although only one set of CPU fuse block 211 and one set of CPU reconfiguration register 212 are illustrated, multiple CPU fuse blocks 211 and/or CPU reconfiguration registers 212 can also be used.

Figure 3:
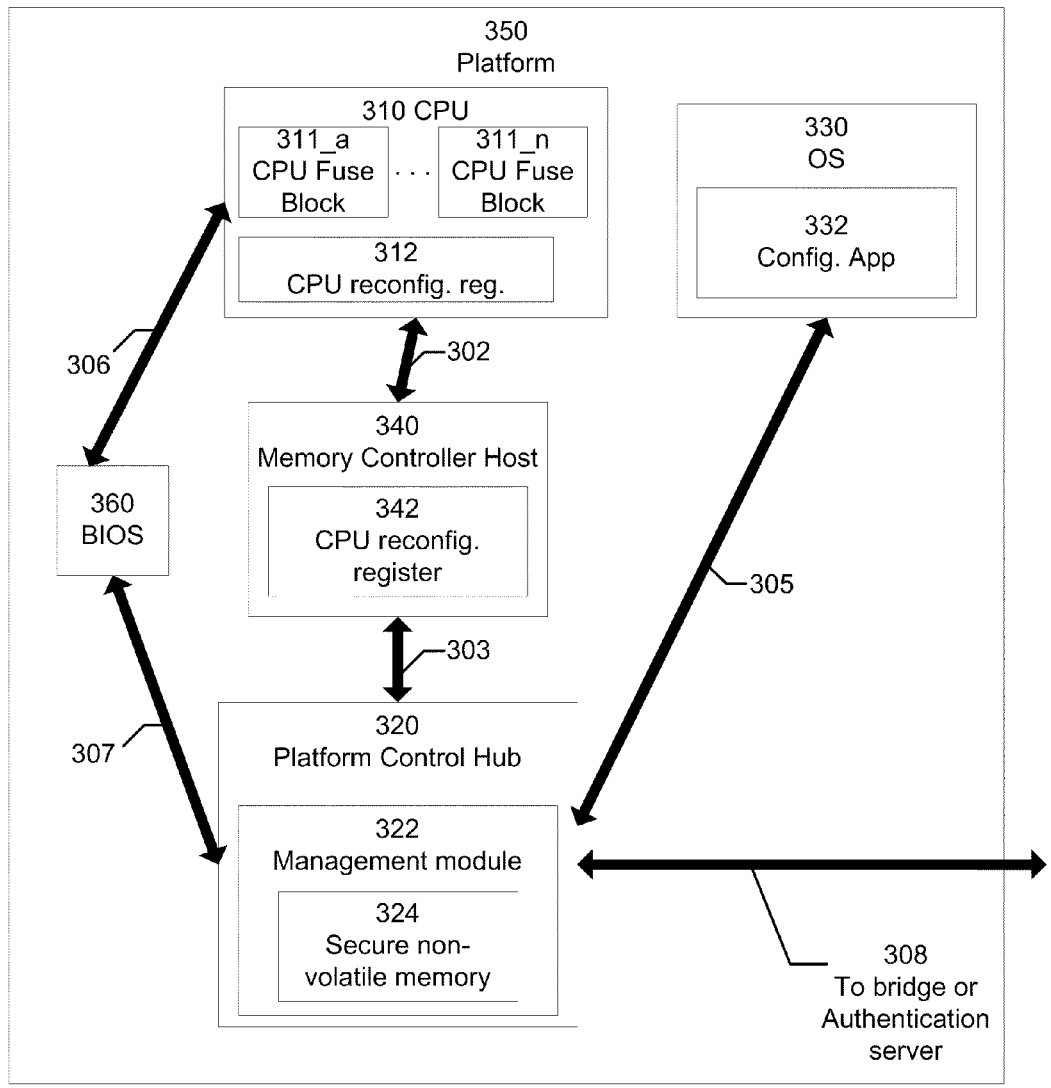
FIG. 3 illustrates a platform configuration according to one embodiment of the invention.

FIG. 3 illustrates a platform configuration 300 according to one embodiment of the invention. The platform 350 has five modules, namely, the CPU 310, the memory controller host (MCH) 340 (or CPU complex), the PCH 320, the BIOS module 360, and the OS 330. The CPU 310 and the OS 330 have the same configuration as the CPU 210 and OS 230 of FIG. 2 and the operation and functionality of the CPU 310 and the OS 330 shall not be repeated herein. The PCH 320 is connected with the BIOS module 360 via communication link 307. In one embodiment, the BIOS module 360 is implemented using Intel® Active Management Technology (AMT) management BIOS extensions (MEBx).

The MM 324 sends a request to the BIOS module 360 to obtain the configuration information of the CPU 310. The BIOS module 360 communicates with the CPU 310 to obtain the configuration information of CPU 310 via communication link 306. The BIOS module 360 then sends the configuration information of CPU 310 to the MM 322. The configuration information of the CPU 310 includes, but is not limited to, identification information, a model number, configurability information on each configurable feature(s), or any other information associated with CPU 310. The MCH 340 interfaces the CPU 310 and the PCH 320 via communication links 302 and 303. The MCH has a CPU reconfiguration register 342 that contains the configuration settings of the configurable feature(s) of the CPU 310.

Although the CPUs 210 and 310 are illustrated in the platforms 250 and 350 as the hardware devices with configurable feature(s), it is not meant to be limiting and other hardware devices such as a chipset can be configured in a similar manner according to the methods disclosed herein. There can be multiple CPUs and/or multiple chipsets that can be configured in platforms 250 and 350 that are not illustrated.

Figure 4:
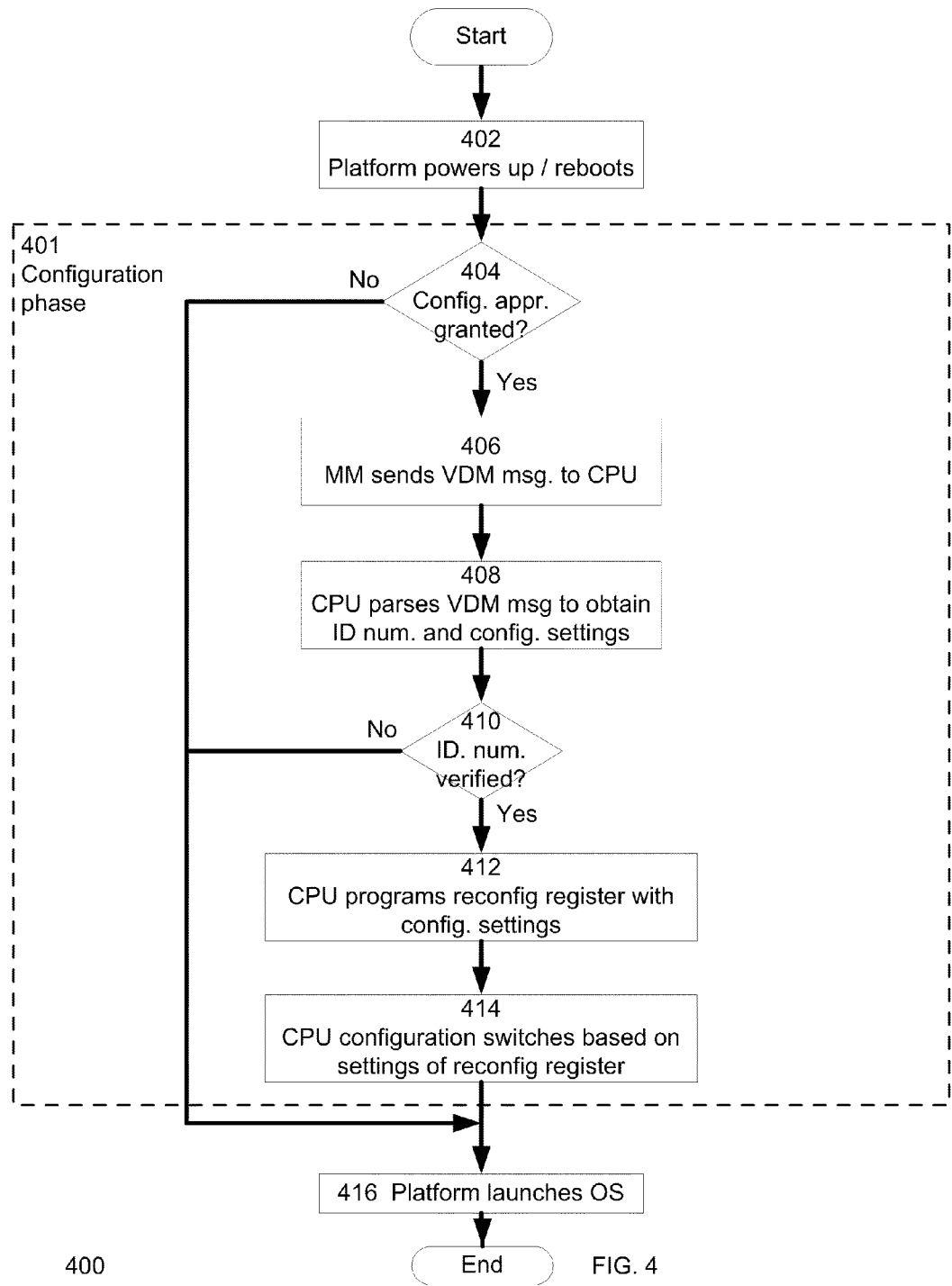
FIG. 4 illustrates a flowchart of the configuration phase of a platform in accordance with one embodiment of the invention.

FIG. 4 illustrates a flowchart 400 of the configuration phase 401 of the platform 250 in accordance with one embodiment of the invention. The configuration phase 401 is performed every time the platform 250 is powered up or rebooted. When the platform 250 loses power, the configurable feature(s) of the CPU needs to be configured again.

In step 402, the platform 250 powers up or reboots. The flow enters the configuration phase 401 of the platform 250. In step 404, the MM 222 checks if approval is granted to authorize the platform 250 to configure the configurable feature(s) of the CPU 210. In one embodiment, the MM 222 determines that the platform is authorized by checking if a permit to authorize the configuration of the configurable feature(s) of the CPU 210 is present in its secure non-volatile memory 324.

In another embodiment, MM 222 checks the expiry date and time of the permit, and determines that the platform 250 is authorized to configure the configurable feature(s) when the current date and time of the platform 250 is prior to the expiry date and time of the permit. This allows a trial period to be set for a particular feature of the CPU 210 to be enabled for the user of the platform 250. After the trial period, the particular feature of the CPU 210 is deactivated and the particular feature will revert to its default settings.

For example, the CPU 210 may have a default clock speed of 1.80 Ghz and the user of the platform 250 obtains a trial period of 30 days to try out a higher clock speed of the CPU 210 at 2.5 Ghz. A permit with 30 days expiry date from the start of the trial date is stored in the secured non-volatile memory 224 of the MM 222. When the platform 250 powers up or reboots, it enters the configuration phase 401 and the CPU 210 is configured to run at 2.5 Ghz. On the 31st day after the start of the trial, the MM 222 determines that the permit has expired and does not send a configuration message to the CPU 210. The CPU 210 then reverts to its default clock setting of 1.8 Ghz.

If approval is not given in step 404, the configuration phase 401 ends and the flow goes to step 416 to launch the OS 230. If approval is given in step 404, the MM 222 sends a vendor defined message (VDM) to the CPU 210. The VDM includes information such as, but is not limited to, CPU identification (CPUID) of CPU 210, a identification number(s) of CPU 210, a model number of CPU 210, or any other information associated with CPU 210. The CPUID, in one embodiment, enumerates the configurability information on each configurable feature of the CPU 210.

In step 408, the CPU 210 parses the VDM to obtain the configuration settings of each configurable feature(s) and the identification number of CPU 210. The CPU 210 verifies if the identification number obtained from the VDM matches its identification number in step 410. If no, the configuration phase 401 ends and the flow goes to step 416 to launch the OS. If yes, in step 412, the CPU 210 programs the CPU reconfiguration register 212 with the configuration settings obtained from step 408. In step 414, the CPU 210 configures its configurable feature(s) based on the settings of the CPU reconfiguration register 212. In one embodiment, the CPU 210 performs the configuration by overriding the contents of CPU fuse block 211 with the contents of the CPU reconfiguration register 212. After the configuration by the CPU 210, the platform 250 launches the OS 230.

With the ability to perform after sales configurability of the hardware device(s) of platform 250, inventory management of the hardware stock keeping unit (SKU) can be improved or eased. For example, if a hardware device such as CPU 210 is available in clock speeds of 1.80 GHz, 2 Ghz, 2.2 GHz. 2.4 Ghz, and 2.50 Ghz, separate inventory management for each version of the hardware device is required. Predicting the right quantity of each hardware SKU to build and managing the inventory of the various SKUs is a big challenge that can be eased with embodiments of the invention. By way of an example, one version of the CPU 210 can be designed to support all the various clock speeds and the default clock setting of the CPU 210 is set at the lowest clock speed of 1.8 Ghz. A user of the platform 250 can then purchase an upgrade permit to configure the CPU 210 to run at a higher clock speed. In this way, only one inventory management is required for the CPU 210 that supports all the various clock speeds.

Figure 5:
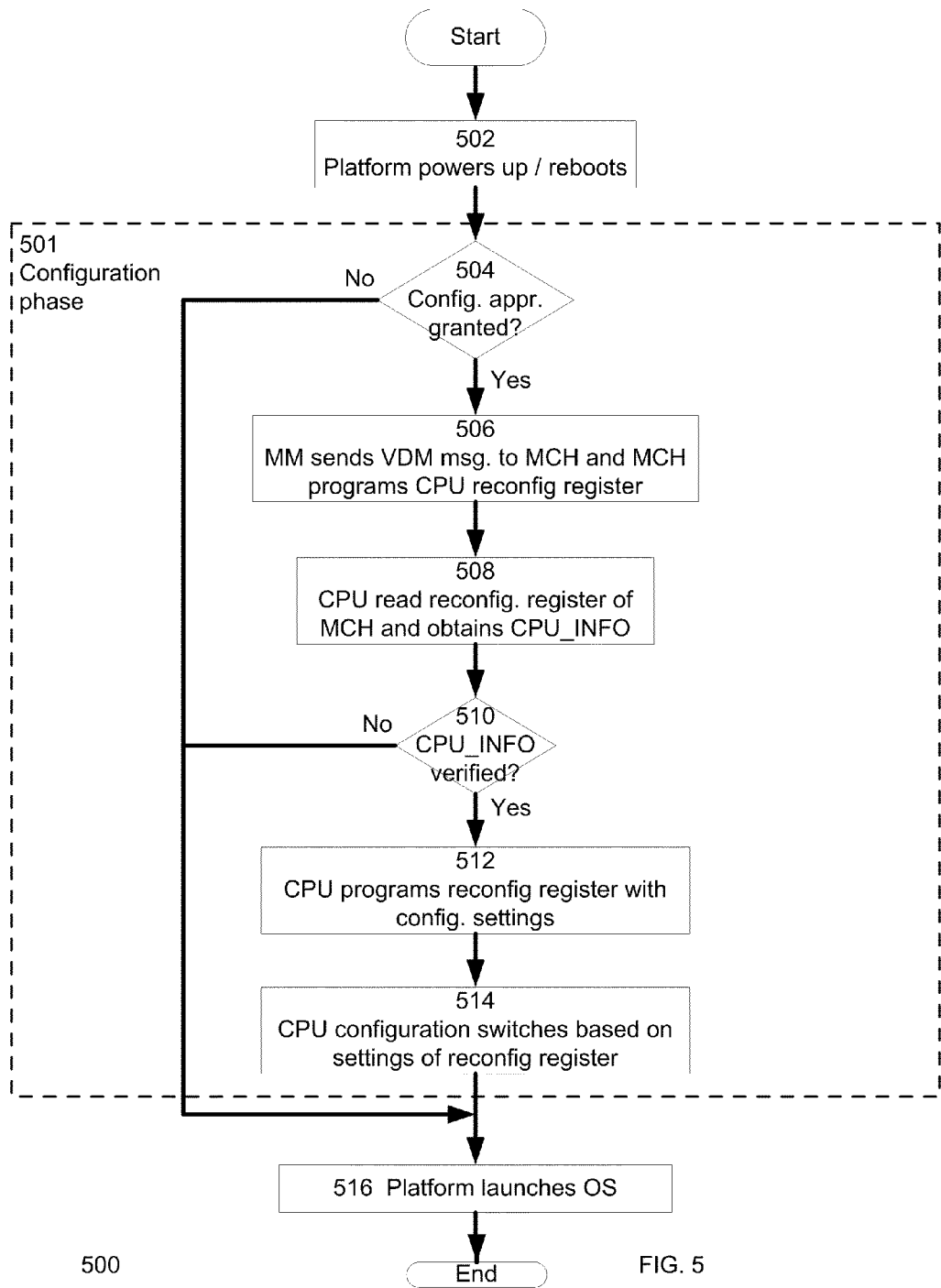
FIG. 5 illustrates a flowchart of the configuration phase of a platform in accordance with one embodiment of the invention.

FIG. 5 illustrates a flowchart 500 of the configuration phase 501 of a platform 350 in accordance with one embodiment of the invention. In step 502, the platform 350 powers up or reboots. The flow enters the configuration phase 501 of the platform 350. In step 504, the MM 322 checks if approval is granted to authorize the platform 350 to configure the configurable feature(s) of the CPU 310. In one embodiment, the MM 322 determines that the platform 350 is authorized by checking if a permit to authorize the configuration of the configurable feature(s) of the CPU 310 is present in its secure non-volatile memory 324.

If no, the configuration phase 501 ends and the flow goes to step 516 to launch the OS 330. If yes, the MM 322 sends a VDM to the MCH 340 in step 506. The MCH 340 parses the VDM to obtain the configuration settings of each configurable feature of the CPU 310 and the CPU information (CPU_INFO) of CPU 310 and programs the CPU reconfiguration register 342 with the configuration settings and the CPU_INFO. In one embodiment, the CPU reconfiguration register 342 of the MCH 340 has only read access availability to the CPU 310. In step 508, the CPU 310 reads the CPU reconfiguration register 342 of the MCH 340 and obtains the CPU_INFO. In step 510, the CPU 310 verifies if the CPU_INFO obtained from the CPU reconfiguration register 342 of the MCH 340 matches its CPU_INFO. If no, the configuration phase 501 ends and the flow goes to step 516 to launch the OS. If yes, in step 512, the CPU 310 programs its CPU reconfiguration register 312 with the contents of the CPU reconfiguration register 342 of the MCH 340 obtained from step 508.

When CPU 310 verifies the configuration message in step 510, it detects that the CPU_INFO obtained from the CPU reconfiguration register 342 of the MCH 340 does not match its CPU_INFO. The CPU 310 may perform a recovery action such as, but is not limited to, sending a reset request to the platform 350, sending a notification to the MM 322 or aborting the update of its configurable feature(s).

In step 514, the CPU 310 configures its configurable feature(s) based on the settings of the CPU reconfiguration register 312. In one embodiment, the CPU 310 performs the configuration by overriding the contents of CPU fuse block 311 with the contents of the CPU reconfiguration register 312. By overriding the fuse configuration of the CPU fuse block 311, by way of an example, a particular feature of the CPU 310 previously disabled by fuses can now be enabled if that particular feature was turned off during manufacturing time.

Figure 7:
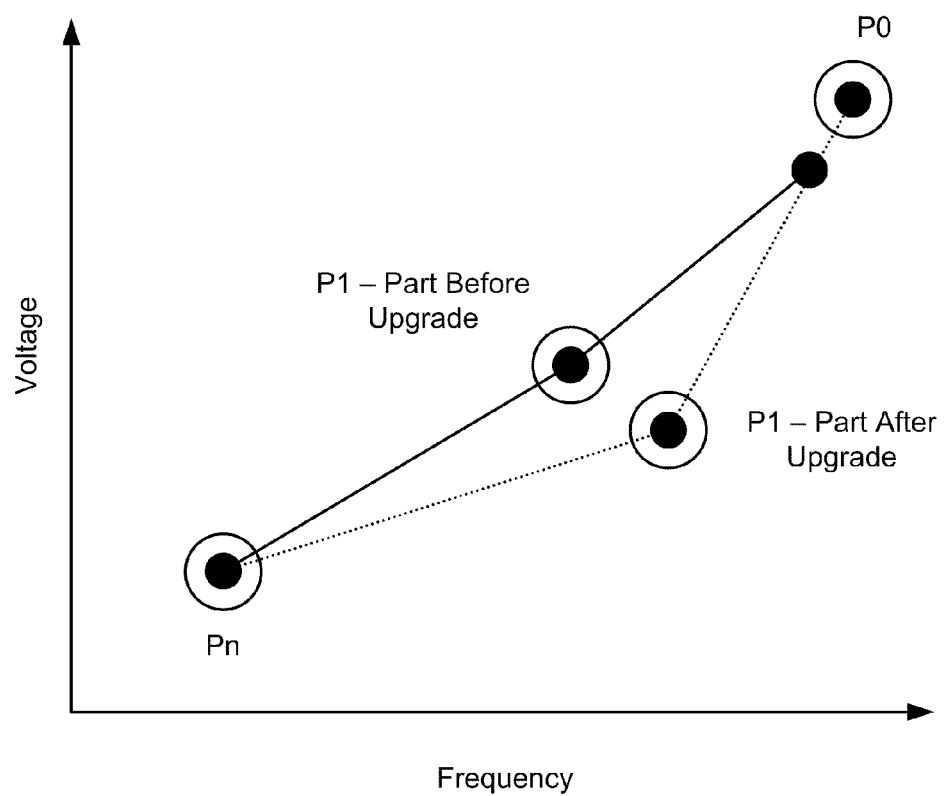

FIG. 7 shows an exemplary range of many potential P-states of a CPU after reconfiguration according to any of the embodiments discussed herein. As illustrated, the "new" P1 state has a higher frequency and lower voltage and is thus better performing. Additionally, the P0 state while at a higher voltage operates at a higher frequency too.

In some embodiments of the invention, the cost of entry to bring new SKUs to market when the demand for those features within the SKUs has not been established yet may be reduced. This is because of lesser inventory management with fewer hardware SKUs to maintain.

The above described systems, methods, and apparatuses allowed for features to be enabled in the field based on post-sale end user upgrade and overriding fuse settings that do not automatically occur due to bundling of a particular PCH with a particular CPU (this type of enablement is called dynamic overriding). In doing so, they practiced a form of security called "Level 1." In this level, upgrades are stored in secure non-volatile memory of the management module. During boot, the last known good configuration's reconfiguration is sent to the CPU by the PCH so that the CPU may be upgraded. Level 1 security may be further expanded to have the management module later confirm that the reconfiguration was valid and perform a reset if this assumption was bad. This level of security is CPU specific.

Level 2 includes a CPU specific license blob (VLB) in the PCH in addition to the permit. (Throughout the following description license blob and VLB are used interchangeably.) In level 2, the boot strap processor will verify the license blob and if the license blob is bad it will go into error shutdown.

Figure 8:
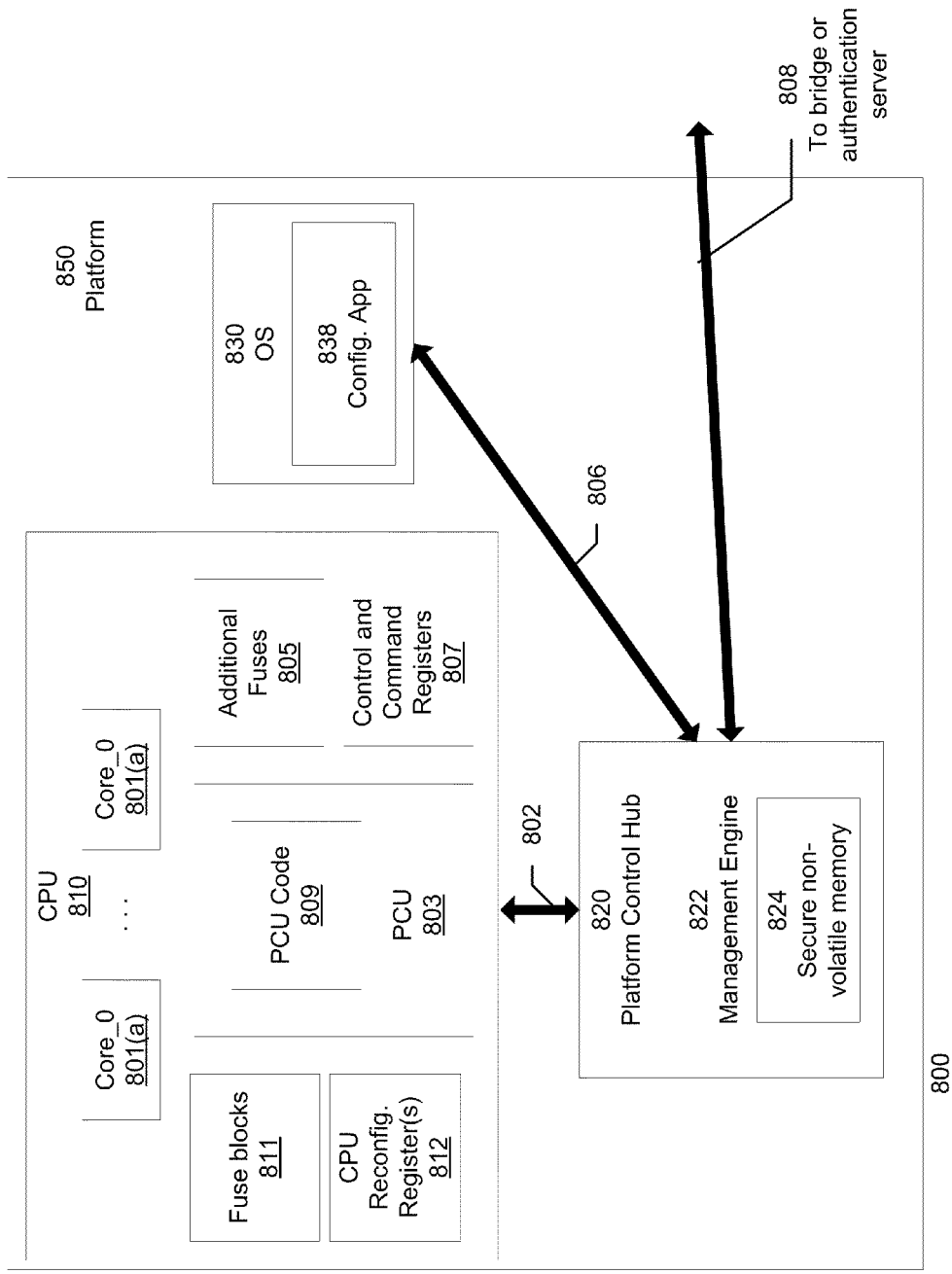
FIG. 8 illustrates an exemplary platform similar to that described in FIG. 2.
Figure 9:
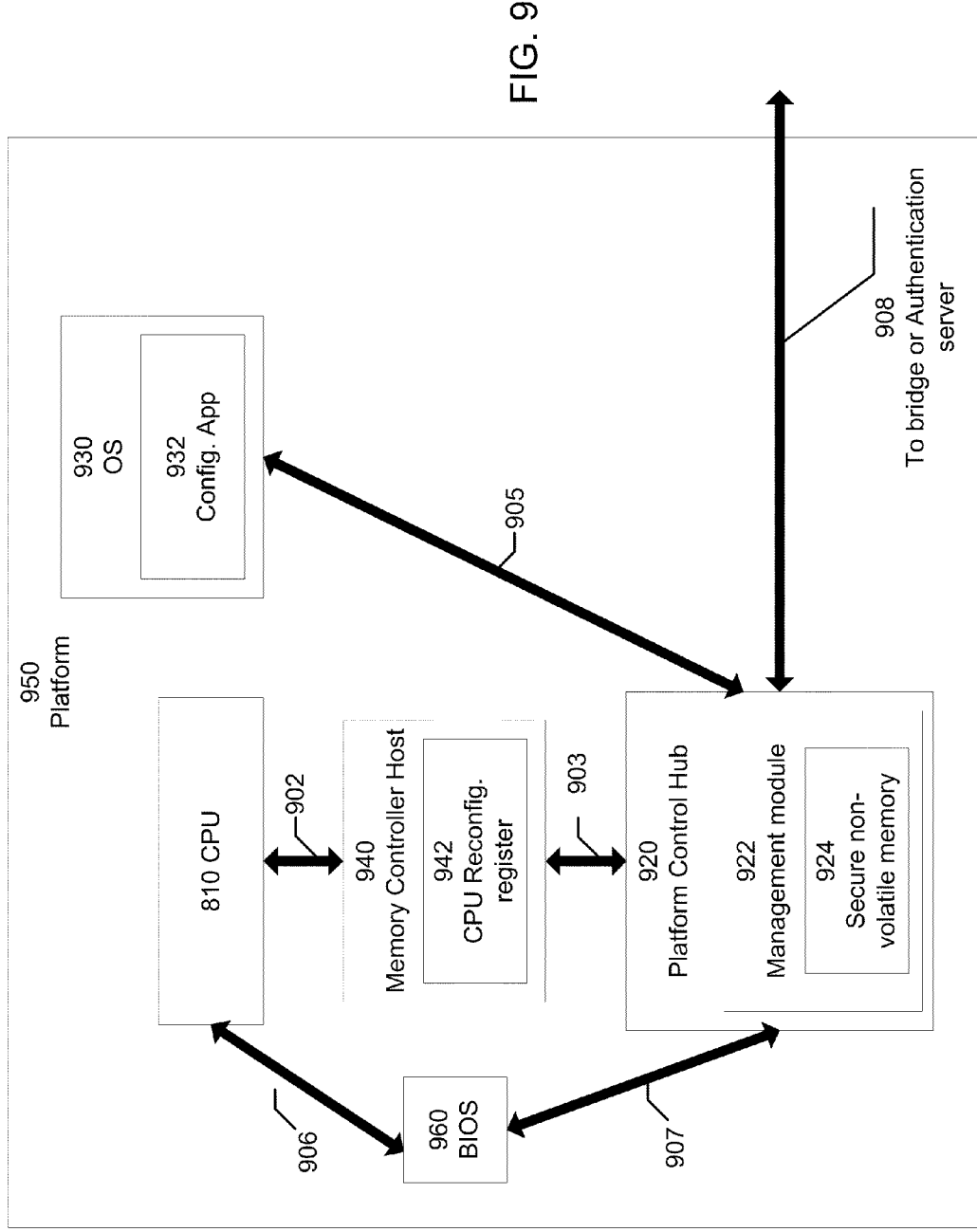
FIG. 9 illustrates an exemplary platform similar to the one discussed in FIG. 3.

In some embodiments, the use of Level 2 security requires CPU components that were not previously discussed. FIG. 8 illustrates an exemplary platform similar to that described in FIG. 2 that includes such a CPU. FIG. 9 illustrates an exemplary platform similar to the one discussed in FIG. 3 that includes such a CPU. The other components are similar, if not identical, to the similarly numbered components of FIG. 2. Note that while the term "management engine" is used below instead of "management module" the two are synonymous. The CPU 810 includes the components of CPUs 210 and 310 such as one or more CPU fuse blocks 811 and CPU reconfiguration registers 812. Also illustrated is a plurality of cores 801 to process instructions which while present in the previous CPUs 210, 310 had not been illustrated. However, in some embodiments there is only a single core 801. In an embodiment, these cores 801 are X86 compliant and utilize firmware.

Coupled to the cores, directly or indirectly, is a Power Control Unit (PCU) 803. The PCU 803 is an on-die microcontroller that manages power consumption of the CPU 810. The PCU 803 comes with its own firmware 809 and gathers data from temperature sensors, monitors current and voltage, and takes input from operating systems.

The CPU 810 may also include control and command registers 807 and additional fuses 805 as are discussed with respect to FIGS. 10 and 11 below. While these registers 807 and fuses 805 are illustrated as being external to the cores 801 and PCU 803, one or more of these registers 807 and fuses 805 may be located in one of these components.

Figure 10:
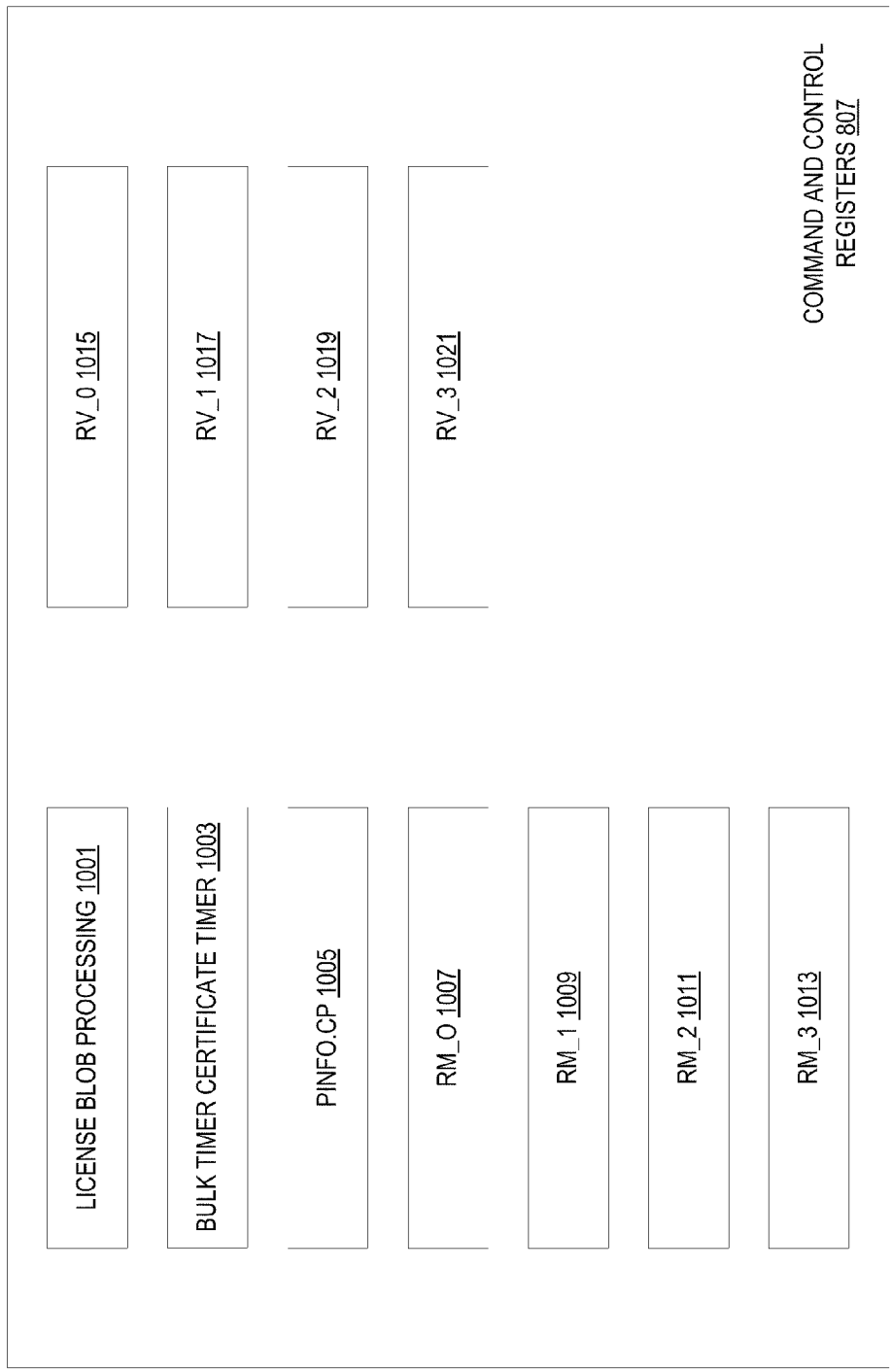
FIG. 10 illustrates an embodiment of some control and command registers of the CPU 810.
Figure 11:
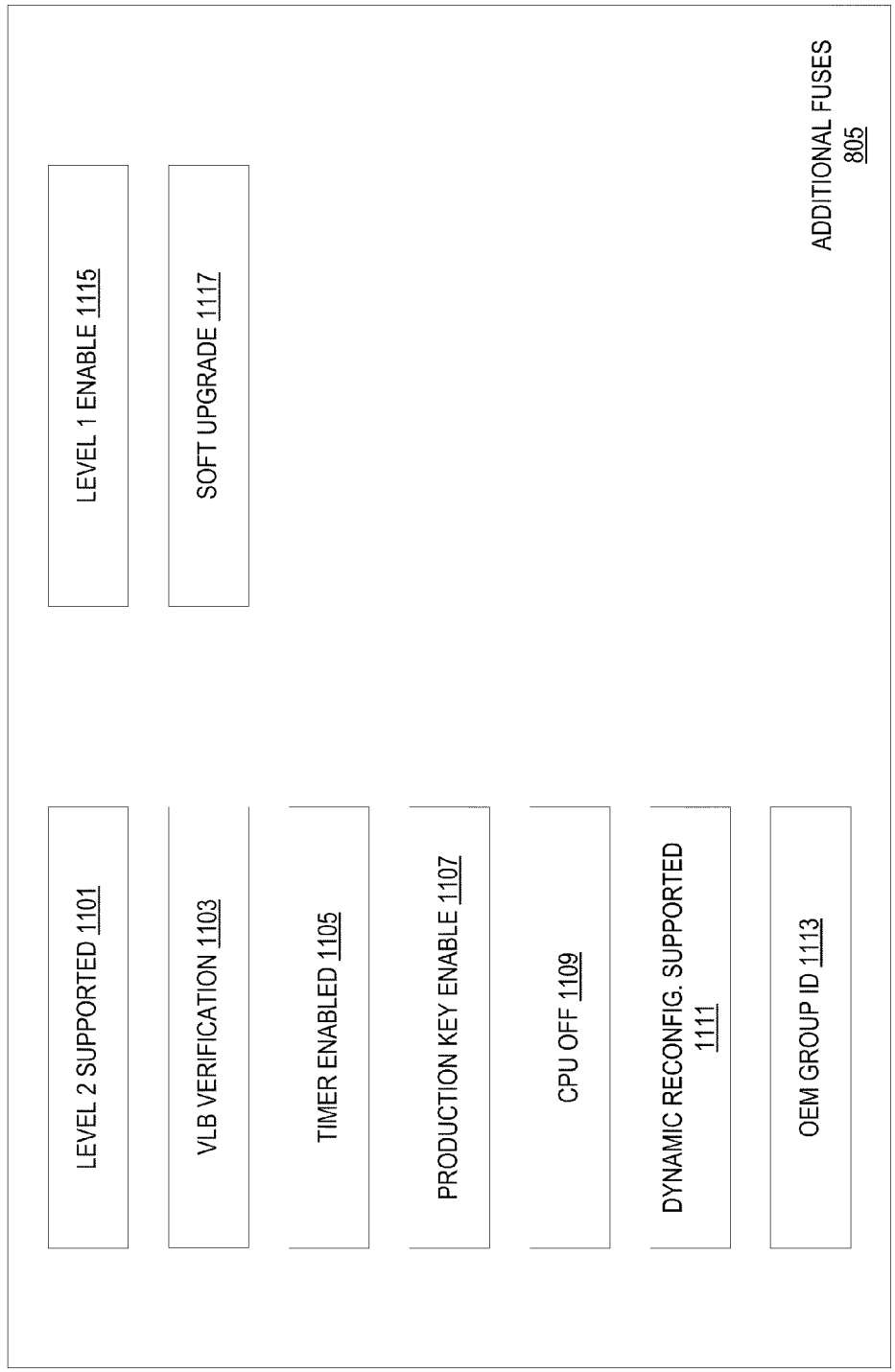
FIG. 11 illustrates an embodiment of some fuses of the CPU.

FIG. 10 illustrates an embodiment of some control and command registers of the CPU 810. These registers 807 are used in some embodiments to support at least one level of security in the CPU (such as Level 2 security). The first register is called the license blob processing register 1001. The values stored in this register 1001 indicate: 1) if level 2 processing is required; 2) what entity to use to verify a stored VLB; 3) if the CPU is in an "OFF" state; and 4) an OEM group ID used to verify that the CPU 810 has a valid permit. In one embodiment, the first three values use the first three bits of the register 1001 and the OEM group ID occupies the last eight bits. However, this is merely an illustrative example.

The next register is the bulk certificate timer register 1003. This is used as a decrementing counter when allowing an OEM or end user to try a feature for a limited amount of time. Once written to the bulk certificate timer register 1003 will decrement until it reaches zero, at which point it will assert a timeout signal as will be discussed later that causes the CPU 801 to shutdown. In some embodiments, the value in this register can only be written to once. The size of this register in an embodiment is 46 bits.

A processor information capabilities (PINFO.CP) register 1005 stores the upgrade capability information of the CPU 810. In an embodiment, code running on the PCU 803 assembles this information. The size of this register in an embodiment is 32 bits.

The command and control registers 807 may also include one or more registers to store reconfiguration mask (RM) information. In the illustrated embodiment, four 32-bit registers 1007, 1009, 1011, and 1013 to store this data. Similarly, there may also be one or more registers to store reconfiguration values (RV). The embodiment illustrated uses four 32-bit registers 1015, 1017, 1019, and 1021 for this as well.

While not illustrated, the registers 807 may also include a processor information identification (PINFO.ID) register (that contains CPU family/model/stepping information) and/or a processor information upgrade (PINFO.UG) register. However, in most embodiments this is stored elsewhere in the CPU.

The CPU 810 may also include several fuses 805 to enable/disable portions of the security levels. FIG. 11 illustrates an embodiment of some fuses of the CPU. The first of such fuses is the level 2 supported fuse 1101 which is used to communicate to a PCH coupled to the CPU 810 the capabilities of the CPU 810 (such as whether the CPU 810 supports Level 2 security or only Level 1). The next fuse is license blob verification 1103 and is used to reconfigure the value written to the license blob processing register 1001 if necessary. A timer enabled fuse 1105 is used to allow the bulk certificate/MTP timer in the PCU 803 to enable the timeout to cause some of the clocks to the CPU 810 to stop. A production key hash enable fuse 1107 is used to choose which set of entries keys to use to authenticate a stored/received VLB. One set of the public key hash is used for debugging and another set is for production.

A CPU off fuse 1109 is used to limit the functionality of the CPU 810 to a predetermined amount of minutes by arming an MTP timer if a permit is not loaded in the PCH as will be discussed below. The dynamic reconfigure supported fuse 1111 is used to enable dynamic updating. An OEM group ID fuse 1113 is a value used to verify that the CPU 810 may have a valid permit. In an embodiment, this is an 8-bit value used in all parts used by the OEM that will be changed in later production runs if compromised.

There is also a fuse 1115 that indicates whether the CPU 810 is enabled to support L1 upgrading and another fuse 1115 to indicate if the CPU 810 is enabled to support soft upgrading.

In some embodiments, the above described CPU 810 may be dropped into either platform 250, 250 that was previously described as it is backward compatible. As such it may communicate with the PCHs 220, 320, management modules 322, 324, etc.

For the following discussion, the flows may utilize at least some of the components of FIG. 1, 2, 3, or 8 such as the manageability engines (ME) 222, 322, 822, CPUs 210, 310, and 810, and license server 130. However, the following discussion is not limited to using the components of those figures. Additionally, for the sake of simplicity, references are only made to the reference numbers of FIG. 8 and no other platforms, although this discussion is applicable to all of the platforms that were discussed.

Boot Sequence for L1 Security

Figure 12:
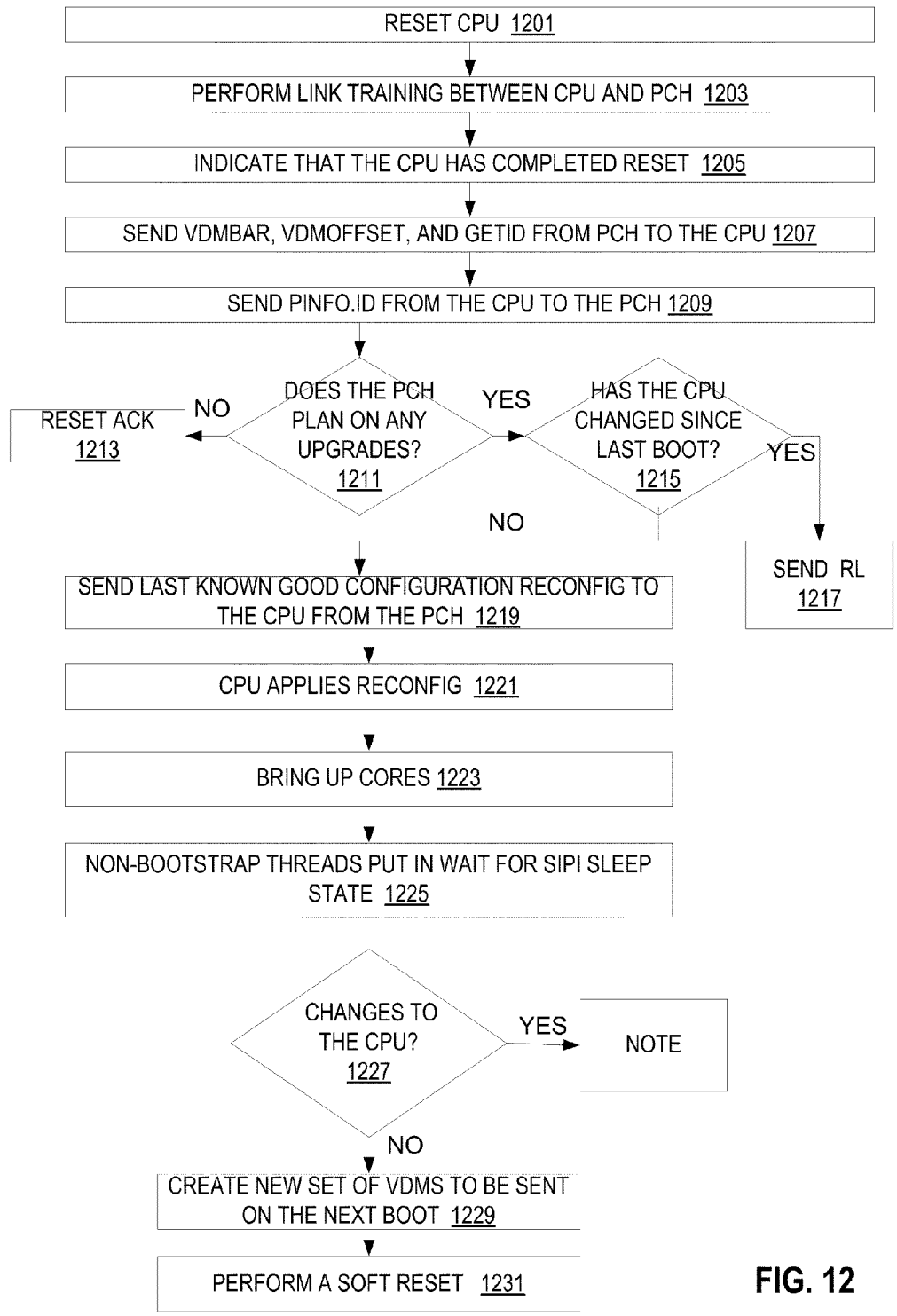
FIG. 12 illustrates an embodiment of a flow for a platform boot sequence using L1 security.

FIG. 12 illustrates an embodiment of a flow for a platform boot sequence using L1 security. At 1201, the PCH 820 sends a reset signal to the CPU 810 to cause the CPU 810 to begin resetting. At 1203, link training is performed between the CPU 810 and PCH 822 which may include a strap set notification from the PCH 822 to the CPU 810. For example, a identification interconnect (DMI, HyperTransport, etc.) training sequence is performed at this time. After this training, the CPU 810 sends a CPU reset done notification to the PCH 824 at 1205.

At this point, the PCH 822 and CPU 810 are ready to perform a handshaking routine (this particular handshaking routine may be referred to as a phase 1 handshake). First, the PCH 822 sends VDMs including BAR (base address register) and OFFSET VDMs at 1207 so that the CPU 810 can return messages properly to the PCH 822. The PCH 822 also sends a request for the CPU's processor identification (sometimes called a GETID request). The CPU 810 responds to the PCH 822 with the PINFO.ID information that it has stored. As discussed above, PINFO.ID contains CPU family/model/stepping information and may be stored in a dedicated register or elsewhere in the CPU 810. In an embodiment, the PCU 803 is the CPU 810 component that responds and it is aware of if it supports L1 security due to the settings in its fuses and registers (such as the settings in the level 1 enable fuse 1115, level 2 supported fuse 1101, soft updating fuse 1117, and/or LB verification fuse 1103).

A determination of if the PCH 822 plans any upgrades for the CPU 810 is made at 1211. If no upgrades are planned, then the PCH 822 sends a CPU reset done acknowledgement to the CPU 810 at 1213.

However, if the PCH 822 plans on making an upgrade, the PCH 822 determines if the CPU 810 has changed from the last boot at 1215 by comparing the CPU information it received to information about the CPU 810 that it had previously acquired. For example, if a different CPU been dropped into the platform and therefore should not be eligible for an upgrade. If the CPU 810 has changed from the last reset, then the PCH 822 will send a vendor defined (VDM) reconfiguration lock (RL) message to the CPU 810 at 1217. A CPU receiving only this message will not be upgraded and its fuses that determine its configuration will remain unchanged as RL signifies the end of reconfiguration information.

If the CPU 810 has not changed, then the PCH 822 will send the last known good configuration's reconfiguration to the CPU 810 at 1219. This reconfiguration is stored in the PCH's 822 secure non-volatile memory 824. The reconfiguration values include the reconfiguration mask (RM) and reconfiguration value (RV) which are sent as VDMs to the CPU 810. The PCH 822 will also send a VDM RL message. In some embodiments, the RM and RV are 128-bits. In those embodiments, the PCH 822 sends four RM and RV VDMs where each VDM contains a 32-bit address and 32-bits of data. The first VDM is [31:0], the second [63:32], etc. Each of these VDMs will be placed in its corresponding register 1007-1021 of the CPU 810. Then PCH 822 will also send a CPU reset done acknowledgement to the CPU 810. At this point in time, the phase 1 handshaking has been completed.

In some embodiments during this handshaking the PCU 803 will set a value in the license blob processing register 1001 to indicate that level 2 processing is required. This value may also be set to indicate that license blob processing should not be performed if the level 2 supported fuse 1101 indicates that the CPU 810 does not support it or if the soft upgrade fuse 1117 indicates that soft upgrading is not supported. In some embodiments, during this handshaking the PINFO.CP information is constructed and placed in that register 1005. Additionally, these activities may be performed by the PCU Code 809.

If the CPU 810 is fused as being capable of upgrading, the CPU 810 will apply the received reconfiguration at 1221. In an embodiment, the PCU 803 performs this updating prior to continuing the boot sequence. In some embodiments, RMs are 128-bits with the lower 32-bit for dynamic fusing and the upper 96-bits for soft updating. RVs are also 128-bits in those embodiments and give the value of the reconfiguration in those bit positions. The PCU 803 maintains a mapping of the bits to the fuses and registers.

At 1223, the PCU 803 will bring up the cores. The non-boot strap processor (BSP) threads will be placed in a wait for Start-up Inter-Processor Interrupt (SIPI) state at 1225 either by reset firmware (for the primary threads per core) or hardware (for the secondary threads per core).

After the CPU reset done acknowledgement has occurred, and in parallel to what has been described above, more of the components of the PCH 822 will have awakened. For example, the ME 824 may be awake. If the ME 824 is awake, it determines if there have been changes to the CPU 810 at 1227. If there have been no changes then this is noted. If there have been changes, a new set of VDMs regarding those changes are generated by the PCH 822 (for example, by the ME 824) to be sent at the next boot at 1229 and a soft reset is performed at 1231. In some embodiments, this determination must be made within 10 ms of the CPU reset done acknowledgement.

While in the above description the PCU 803, PCH 822, and ME 824 are discussed as performing several actions, other components of the may perform one or more of the actions.

Boot Sequence for L2 Security

Figure 13:
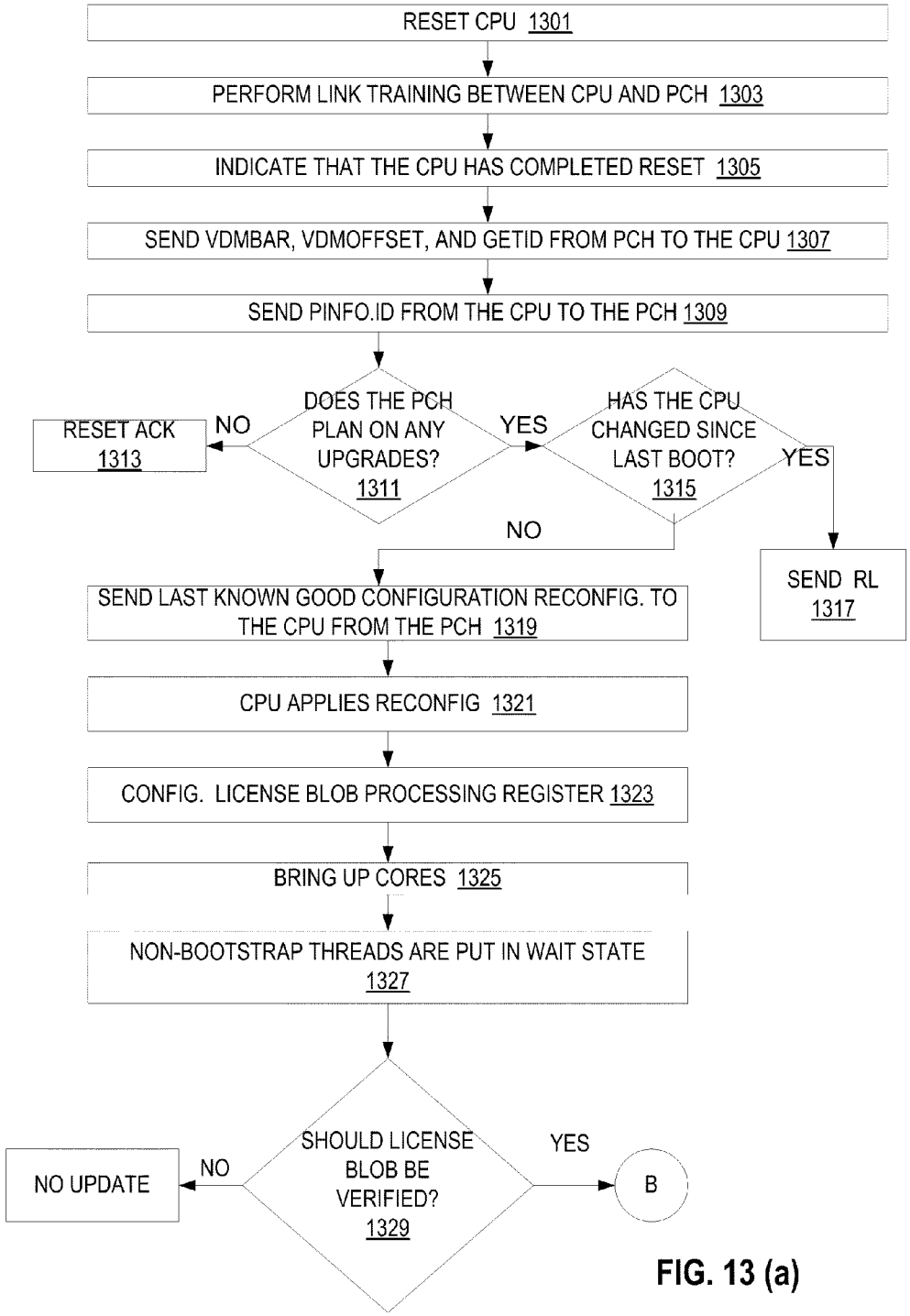
FIG. 13 illustrates an embodiment of a flow for a platform boot sequence using L2 security.
Figure 13B:
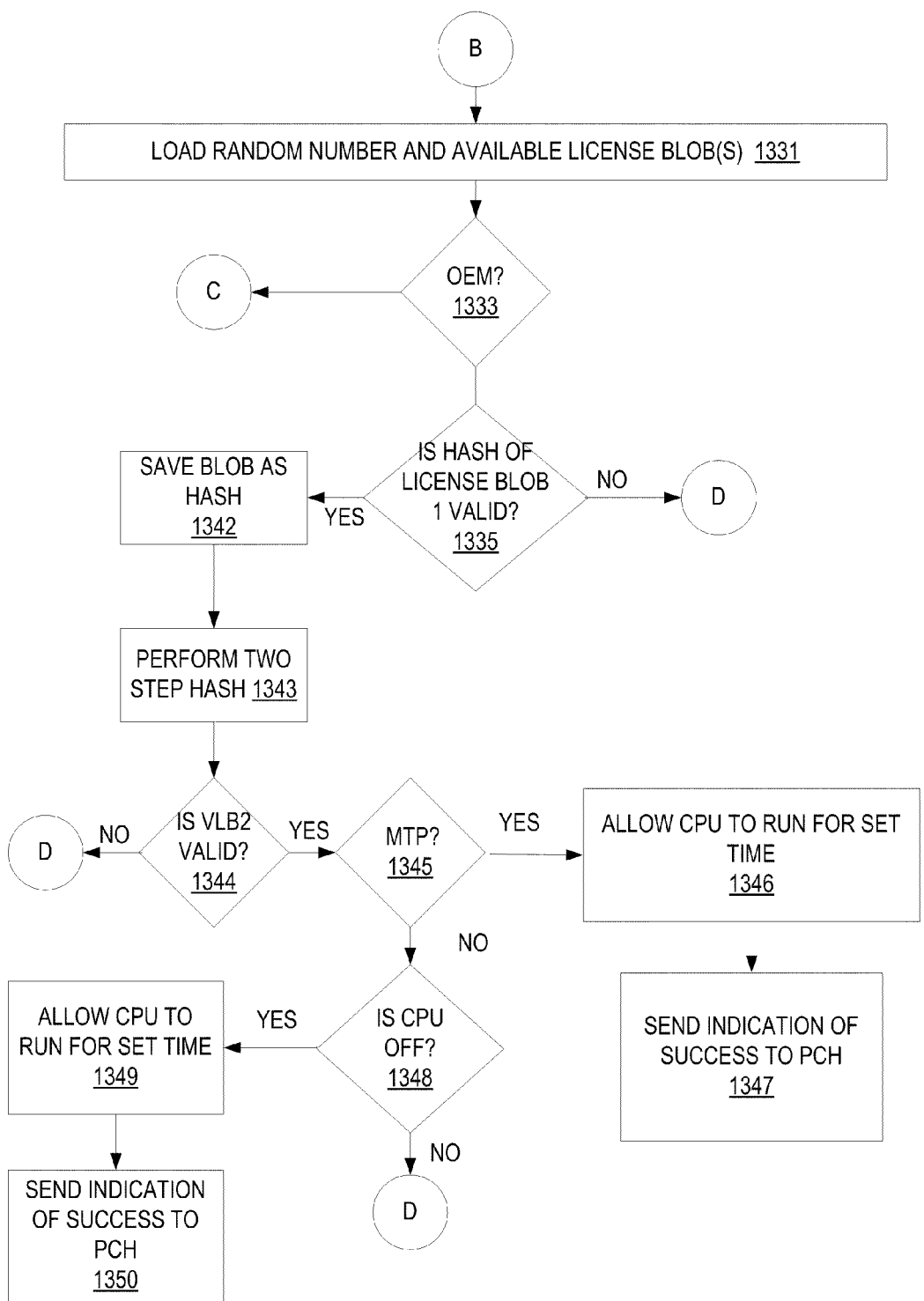
Figure 13C:
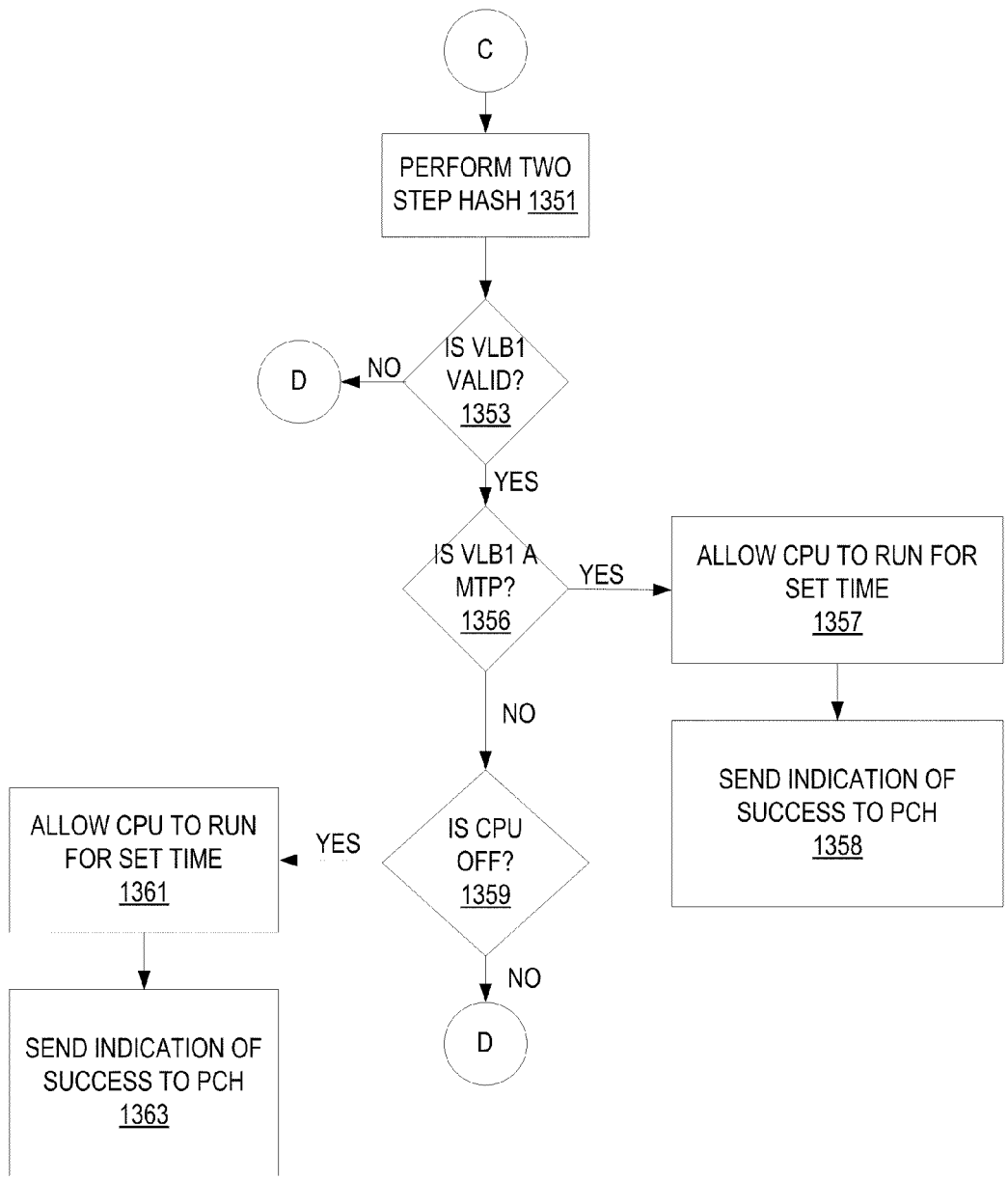

FIG. 13 illustrates an embodiment of a flow for a platform boot sequence using L2 security. At 1301, the PCH 820 sends a reset signal to the CPU 810 to cause the CPU 810 to begin resetting. At 1303, link training is performed between the CPU 810 and PCH 822 which may include a strap set notification from the PCH 822 to the CPU 810. For example, a identification interconnect (DMI, HyperTransport, etc.) training sequence is performed at this time. After this training, the CPU 810 sends a CPU reset done notification to the PCH 824 at 1305.

At this point, the PCH 822 and CPU 810 are ready to perform a handshaking routine (this particular handshaking routine may be referred to as a phase 1 handshake). First, the PCH 822 sends VDMs including BAR (base address register) and OFFSET VDMs at 1307 so that the CPU 810 can return messages properly to the PCH 822. The PCH 822 also sends a request for the CPU's processor identification (sometimes called a GETID request). The CPU 810 responds to the PCH 822 with the PINFO.ID information that it has stored. As discussed above, PINFO.ID contains CPU family/model/stepping information and may be stored in a dedicated register or elsewhere in the CPU 810. In an embodiment, the PCU 803 is the CPU 810 component that responds and it is aware of if it supports L1 security due to the settings in its fuses and registers (such as the settings in the level 1 enable fuse 1115, level 2 supported fuse 1101, soft updating fuse 1117, and/or LB verification fuse 1103).

A determination of if the PCH 822 plans any upgrades for the CPU 810 is made at 1311. If no upgrades are planned, then the PCH 822 sends a CPU reset done acknowledgement to the CPU 810 at 1313.

However, if the PCH 822 plans on making an upgrade, the PCH 822 determines if the CPU 810 has changed from the last boot at 1315 by comparing the CPU information it received to information about the CPU 810 that it had previously acquired. For example, if a different CPU been dropped into the platform and therefore should not be eligible for an upgrade. If the CPU 810 has changed from the last reset, then the PCH 822 will send a vendor defined (VDM) reconfiguration lock (RL) message to the CPU 810 at 1317. A CPU receiving only this message will not be upgraded and its fuses that determine its configuration will remain unchanged as RL signifies the end of reconfiguration information.

If the CPU 810 has not changed, then the PCH 822 will send the last known good configuration's reconfiguration to the CPU 810 at 1319. This reconfiguration is stored in the PCH's 822 secure non-volatile memory 824. These reconfiguration values include the reconfiguration mask (RM) and reconfiguration value (RV) which are sent as VDMs to the CPU 810. The PCH 822 will also send a VDM RL message. In some embodiments, the RM and RV are 128-bits. In those embodiments, the PCH 822 sends four RM and RV VDMs where each VDM contains a 32-bit address and 32-bits of data. The first VDM is [31:0], the second [63:32], etc. Each of these VDMs will be placed in its corresponding register 1007-1021 of the CPU 810. Then PCH 822 will also send a CPU reset done acknowledgement to the CPU 810. At this point in time, the phase 1 handshaking has been completed.

In some embodiments during this handshaking the PCU 803 will set a value in the license blob processing register 1001 to indicate that level 2 processing is required. This value may also be set to indicate that license blob processing should not be performed if the level 2 supported fuse 1101 indicates that the CPU 810 does not support it or if the soft upgrade fuse 1117 indicates that soft upgrading is not supported. In some embodiments, during this handshaking the PINFO.CP information is constructed and placed in that register 1005. Additionally, these activities are performed by the PCU Code 809 in some embodiments.

If the CPU 810 is fused as being capable of upgrading, the CPU 810 will apply the received reconfiguration at 1321. In an embodiment, the PCU 803 performs this updating prior to continuing the boot sequence. In some embodiments, RMs are 128-bits with the lower 32-bit for dynamic fusing and the upper 96-bits for soft updating. RVs are also 128-bits in those embodiments and give the value of the reconfiguration in those bit positions. The PCU 803 maintains a mapping of the bits to the fuses and registers.

At 1325, the PCU 803 will bring up the cores. The non-boot strap processor (BSP) threads will be placed in a wait for Start-up Inter-Processor Interrupt (SIPI) state at 1327 either by reset firmware (for the primary threads per core) or hardware (for the secondary threads per core).

A determination of if the license blob should be verified is made at 1329. Again, this is determinable based on the fuses (such as LB verification fuse 1103) and/or registers (such as license blob processing 1003). If the license blob verification should not be performed then the CPU 810 will not be updated. If license blob verification should be performed, a previously generated random number (R) and the available license blob(s) (in OEM architectures there are two license blobs—VLB1 and VLB2 and in end user architectures there is only one license blob—VLB1 or VLB) are loaded from the PCH 822 to the CPU 810 at 1331. Both R and the license blob(s) are verified as discussed below. Additionally, in a subsequent discussion, the contents of VLB1 and VLB2 according to some embodiments is described.

A determination of if the license blob(s) is an OEM "bulk" blob or a user blob is made at 1333. A bulk certificate is used by the OEM to test units at an upgraded level without purchasing the upgrade. This will allow them to certify that an upgrade will meet end user expectations without fear of warranty revocation. The term "bulk" refers to a license blob that applies to multiple units for test. As such, for bulk certificates the identification numbers are not material, but R is as there generally are few Rs per OEM. In order to determine that the VLB(s) belongs to a bulk certificate, the VLB header is checked to see what the VLB(s) describes.

If the license blobs belong to an OEM, a determination of if the hash of the public key of VLB1 is valid is made and the signature of VLB1 is verified using this public key at 1335. In an embodiment, the verification is made by seeing if the 8-bit group ID stored in VLB1 matches the group ID found in the OEM group ID fuse 1113. If it does not match, an error process is started. In this error process, the BSP thread goes into an error shutdown state at 1365. The CPU 810 then sends an indication of failure to the PCH 822 at 1367 and a global reset of the platform is performed at 1369. In global reset, the PCH 822 will send a null upgrade signal until a hard reset is performed which will cause the original upgrades to be sent from the PCH so as to not lose upgrades.

If the hash is valid, the first license blob (VLB1) is stored as the hash of the public key for verifying the second license blob (VLB2) at 1342. A two step hash is performed at 1343. The first hash (H1) will be with the two identification numbers and R. The second hash (H2) will be with H1, PINFO.ID, PINFO.CP, RM, and RV. The hash of the public key stored in VLB2 is compared to the saved hash from VLB1 to determine if VLB2 is valid at 1344. If it is not valid, the error process starts as discussed above. If it is valid, a determination of if there is a bulk certificate/manufacturing test permit (MTP) is made at 1345. VLB2 should not be a MTP and authentication will fail thereby triggering the error process. If it is a MTP, then the bulk certificate timer register 1003 is set to a countdown timer value at 1346 and the CPU is allowed to run for the duration of that timer value. An indication of success is sent from the CPU 810 to the PCH 822 is sent at 1347 and the license blob register is updated to reflect the validity of the VLB.

If there is not a MTP, then a determination of if the CPU 810 is "OFF" is made at 1348 by looking at the license blob processing register 1001. When it is "OFF" the bulk certificate timer register 1003 is set to a countdown value at 1349. An indication of success is sent from the CPU 810 to the PCH 822 at 1350, and the license blob register is updated to reflect the validity of the VLB. If it is not "OFF," then the error process starts.

If the license blob (VLB) belongs to an end-user at 1333, a two step hash is performed at 1351. The first hash (H1) will be with the two identification numbers and R. The second hash (H2) will be with H1, PINFO.ID, PINFO.CP, RM, and RV. The VLB is checked against the public key hash of the CPU 810 at 1353 to determine if it is valid. If it is not valid, the error process starts. If it is valid, a determination of if VLB1 is a bulk certificate/manufacturing test permit (MTP) is made at 1356. As discussed, MTPs allow a user to test a product for a set amount of time. In some embodiments, this is done by checking the time out value of the header of the VLB and if it is non-zero then it is MTP. This may also provide a length of time to allow the CPU 810 to run before shutdown.

If it is a MTP, then the bulk certificate timer register 1003 is set to a countdown timer value at 1357 and the CPU is allowed to run for the duration of that timer value. An indication of success is sent from the CPU 810 to the PCH 822 is sent at 1358 and the license blob register is updated to reflect the validity of the VLB.

If there is not a MTP, then a determination of if the CPU 810 is "OFF" is made at 1359 by looking at the license blob processing register 1001. When it is "OFF" the bulk certificate timer register 1003 is set to a countdown value at 1361. An indication of success is sent from the CPU 810 to the PCH 822 at 1363, and the license blob register is updated to reflect the validity of the VLB. If it is not "OFF," then the error process starts.

After the CPU reset done acknowledgement has occurred, and in parallel to what has been described above, more of the components of the PCH 822 will have awakened. For example, the ME 824 may be awake. If the ME 824 is awake, it determines if there have been changes to the CPU 810 at 1371. If there have been no changes then this is noted. If there have been changes, a new set of VDMs regarding those changes are generated by the PCH 822 to be sent at the next boot at 1373 and a soft reset is performed at 1375. In some embodiments, this determination must be made within 10 ms of the CPU reset done acknowledgement.

In some embodiments, if any of the other threads wake up while the verification process is occurring or after it has failed, the license blob processing register 1001 is reflected to show the failure.

Additionally, in some embodiments, the PCH 822 maintains a VLB authorization result register that stores if the VLB authorization/validation has completed and if it was successful.

While in the above description the PCU 803, PCH 822, and ME 824 are discussed as performing several actions, other components of the may perform one or more of the actions.

Boot-Time Verification for L1

Figure 14:
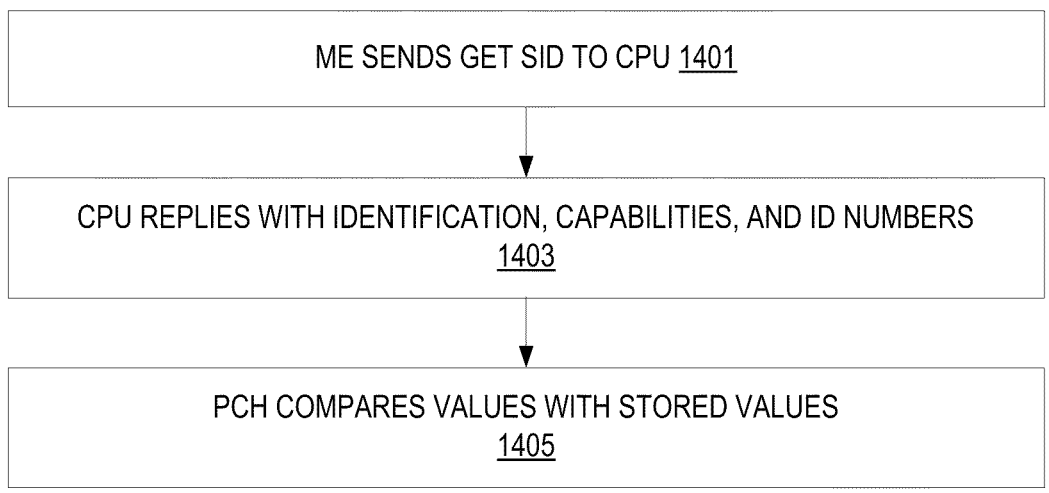
FIG. 14 illustrates an embodiment of a flow for L1 boot verification.

FIG. 14 illustrates an embodiment of a flow for L1 boot verification. This occurs after the handshake of FIG. 12 has been completed. By this time all of the PCH 822 is awake and it re-verifies that the last known configuration is intact. The PCH 822 sends a "GET SID" request to the CPU 810 to ask for the identification of the CPU, its capabilities and identification numbers at 1401. The CPU 810 responds with the requested information at 1405. In an embodiment, the contents of the PINFO.CP register 1005, PINFO.ID, PINFO.UG (upgrade information), and two identification numbers comprise the requested information.

The PCH 822 compares one or more of these values to its stored information on the CPU 810 to determine if that last known configuration is intact at 1405.

Boot-Time Verification for L2

Figure 15:
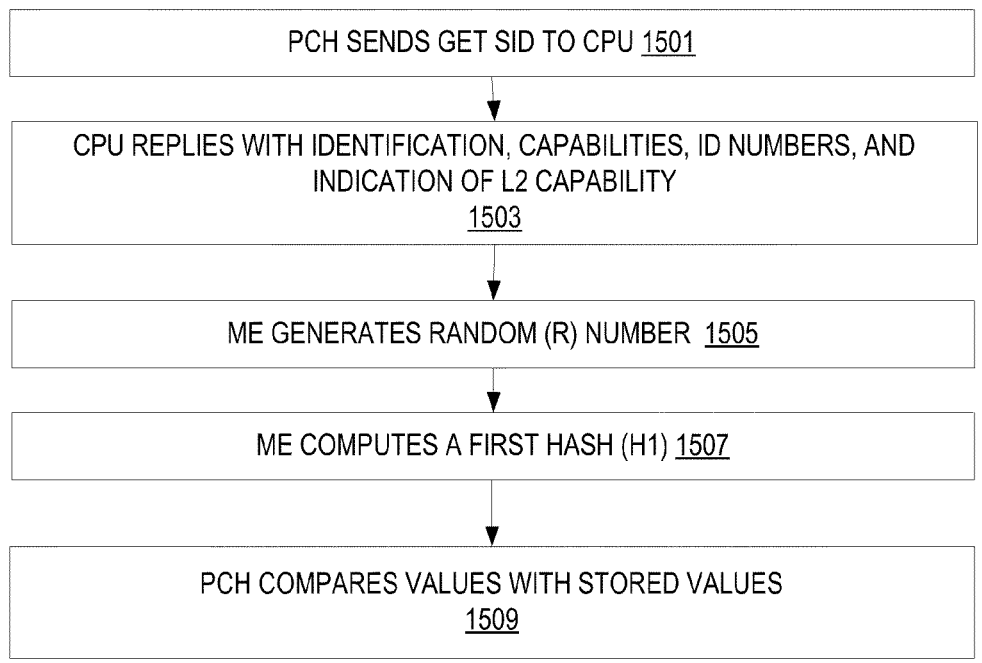
FIG. 15 illustrates an embodiment of a flow for L2 boot verification.

FIG. 15 illustrates an embodiment of a flow for L2 boot verification. This occurs after the handshake of FIG. 13 has been completed. By this time all of the PCH 822 is awake and it re-verifies that the last known configuration is intact.

The PCH 822 sends a "GET SID" request to the CPU 810 to ask for the identification of the CPU, its capabilities and identification numbers at 1501. The CPU 810 responds with the requested information at 1503. In an embodiment, the contents of the PINFO.ID register, PINFO.CP register, PINFO.UG (upgrade information), two identification numbers, and an indication of L2 capability comprise the requested information.

The ME 824 generates a random number (R) at 155. This random number ties the permit to the particular PCH 822 that made the update request. In an embodiment, R is a 64-bit number. The ME 824 then computes a first hash (H1) that includes two identification numbers (which are manufacturing IDs and tie the permit to the CPU that made the request), and R at 1507. In an embodiment, H1 is a SHA-256 hash and any remaining bits that are not occupied by the identification numbers and R before hashing are padded with 1s.

The PCH 822 compares one or more of these values to its stored information on the CPU 810 to determine if that last known configuration is intact at 1507.

Upgrade Structure for L1

Figure 16:
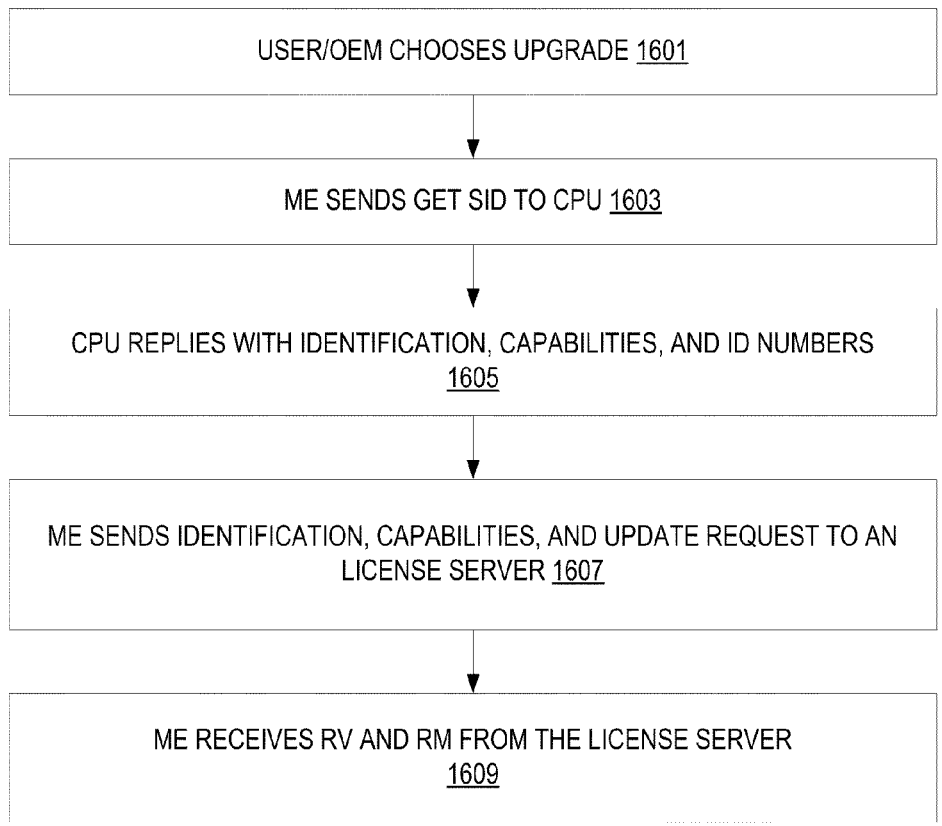
FIG. 16 illustrates an embodiment of a flow for the creation of an upgrade structure to be used in Level 1 based upgrades.

FIG. 16 illustrates an embodiment of a flow for the creation of an upgrade structure to be used in Level 1 based upgrades. At 1601, an end user or OEM chooses an upgrade from a list of upgrade possibilities for a CPU 810 and platform 850. For example, an upgrade to CPU 810 is chosen. This list may be presented to the user through an application that displays what the current and upgrade capabilities of the CPU and platform are.

As a part of a handshaking process, the PCH 820 sends a "GET SID" request to the CPU 810 to ask for the identification of the CPU, its capabilities, and identification numbers at 1603. For example, looking at the platform of FIG. 8, the PCH 820 sends a GET SID request to the CPU 810. In some embodiments, it is the manageability engine that sends this request. Additionally, in some embodiments the request is received by the CPU's PCU 820.

The CPU 810 responds with the requested information at 1605. In an embodiment, the contents of the CPU's PINFO.CP register (such as register 1005), the CPU's PINFO.ID information, the CPU's PINFO.UG (upgrade information), and two identification numbers of the CPU comprise the requested information. The CPU response may also include an update request for the PCH 820 to process. In some embodiments, the manageability engine (ME) 822 receives this request.

The CPU identification and capabilities are sent to a license server from the PCH 820 at 1607. In some embodiments, the ME 822 performs this sending and also sends an update request on behalf of the user to the license server asking for a particular upgrade to be allowed.

The license server responds to the update request of the PCH at 1609 by sending RV and RM information to the PCH 820. Again, in some embodiments, the ME 822 receives this information and stores it in secure non-volatile memory 824. This RM and RV information may then later be used on a subsequent reset to update the CPU 810 as described earlier.

Upgrade Structure for L2

Figure 17:
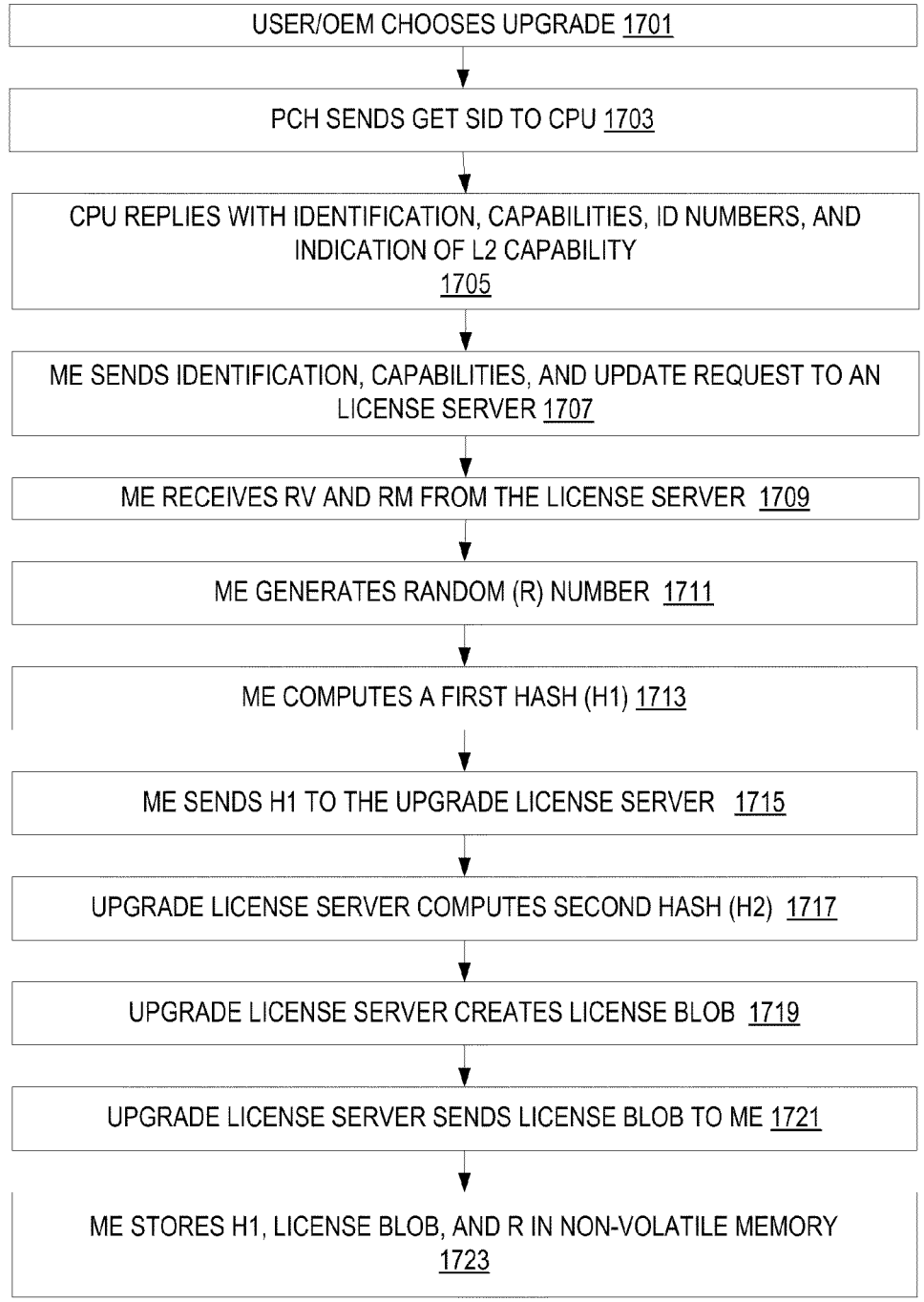
FIG. 17 illustrates an embodiment of a flow for the creation of an upgrade structure for Level 2 security.

FIG. 17 illustrates an embodiment of a flow for the creation of an upgrade structure for Level 2 security. At 1701, an end user or OEM chooses an upgrade from a list of upgrade possibilities for the CPU 810 and platform 850. This list may be presented to the user through an application that displays what the current and upgrade capabilities of the CPU platform.

As a part of a handshaking process, the PCH 820 sends a "GET SID" request to the CPU 810 to ask for the identification of the CPU, its capabilities, and identification numbers at 1703. For example, looking at the platform of FIG. 8, the PCH 820 sends a GET SID request to the CPU 810. In some embodiments, it is the manageability engine that sends this request. Additionally, in some embodiments the request is received by the CPU's PCU 820.

The CPU 810 responds with the requested information at 1705. In an embodiment, the contents of the CPU's PINFO.CP register (such as register 1005), the CPU's PINFO.ID information, the CPU's PINFO.UG (upgrade information), and two identification numbers of the CPU comprise the requested information. The CPU response may also include an update request for the PCH 820 to process. In some embodiments, the manageability engine (ME) 822 receives this request.

The CPU identification and capabilities are sent to a license server from the PCH 820 at 1707. In some embodiments, the ME 822 performs this sending and also sends an update request on behalf of the user to the license server asking for a particular upgrade to be allowed.

The license server responds to the update request of the PCH at 1709 by sending RV and RM information to the PCH 820. Again, in some embodiments, the ME 822 receives this information. This RM and RV information may then later be used on a subsequent reset to update the CPU 810 as described earlier.

The ME 822 generates a random number (R) at 1711. This random number ties the permit to the particular PCH 822 that made the update request. In an embodiment, R is a 64-bit number. The ME 822 then computes a first hash (H1) that includes two identification numbers (which are manufacturing IDs and tie the permit to the CPU 810 that made the request), and R at 1713. In an embodiment, H1 is a SHA-256 hash and any remaining bits that are not occupied by the identification numbers and R before hashing are padded with 1s.

The ME 822 sends H1 to the license server at 1715. The license server computes a second hash (H2) that includes H1, the PINFO.ID and PINFO.CP information described above, a RM, and a RV. In an embodiment, both PINFO.ID and PINFO.CP are 32-bit values and the RM and RV are 128-bit values. The lower 32 bits of both RM and RV are for dynamic fusing and are reset to 0. In an embodiment, H2 is a SHA-256 hash and any remaining bits that are not occupied by H1, PINFO.ID, PINFO.CP, RM, and RV are padded with 1s.

The license server then produces an encrypted (signed) license blob (VLB) at 1719. In an embodiment, the license blob has a 64-byte body comprised of H2 padded with 256 bits of 1s. The server signs the license blob with a private key (e.g., a 2048-bit private key). A 2048-bit public key modulus is also included in the license blob and its hash (e.g., a SHA-256 hash) is stored in the CPU cores. This is sent to the ME 822 at 1721.

The ME 822 stores the permit and license blob along with R in its non-volatile storage 824 at 1723.

OEM Upgrades

OEMs may desire to support fuse-upgrading capabilities, but without the requirement of a connection to an external license server for each upgrade negotiation. In some embodiments, the OEMs are therefore provided with a local signing server. This server is equipped with a Hardware Signing Module (HSM) that will securely hold its own private key. A pair of public-private keys for the local server will be generated and a private key will be provisioned by the party that supplied the license server (such as the CPU manufacturer). The key pair is logically linked to the OEM group ID fuse 1113. A VLB-style permit (VLB1) will issued to the OEM that has the following properties: 1) VLB1 is signed by the license server private key; VLB1 holds in the header the OEM group ID of the targeted CPUs; VLB1's body consists of the hash of the local server's public key; VLB1 does not contain H1 or PINFO information; and VLB1 has a new module type in the header to distinguish it from other VLBs. Typically, the VLB1 is provided with a shipment of upgradeable parts that are fused with the OEM group ID.

In their facility, the OEM uses the local server to generate the license for a particular CPU within the group ID. The local server produces a VLB license (VLB2) tying the CPU's identification to the selected fuse upgrade. This VLB2 is different than the previously described VLB2 in that: it is signed by the local server's private key; it holds the local server's public key (in lieu of the license server's public key); the VLB2 cannot be an MTP; and VLB2 has a different header.

Figure 18:
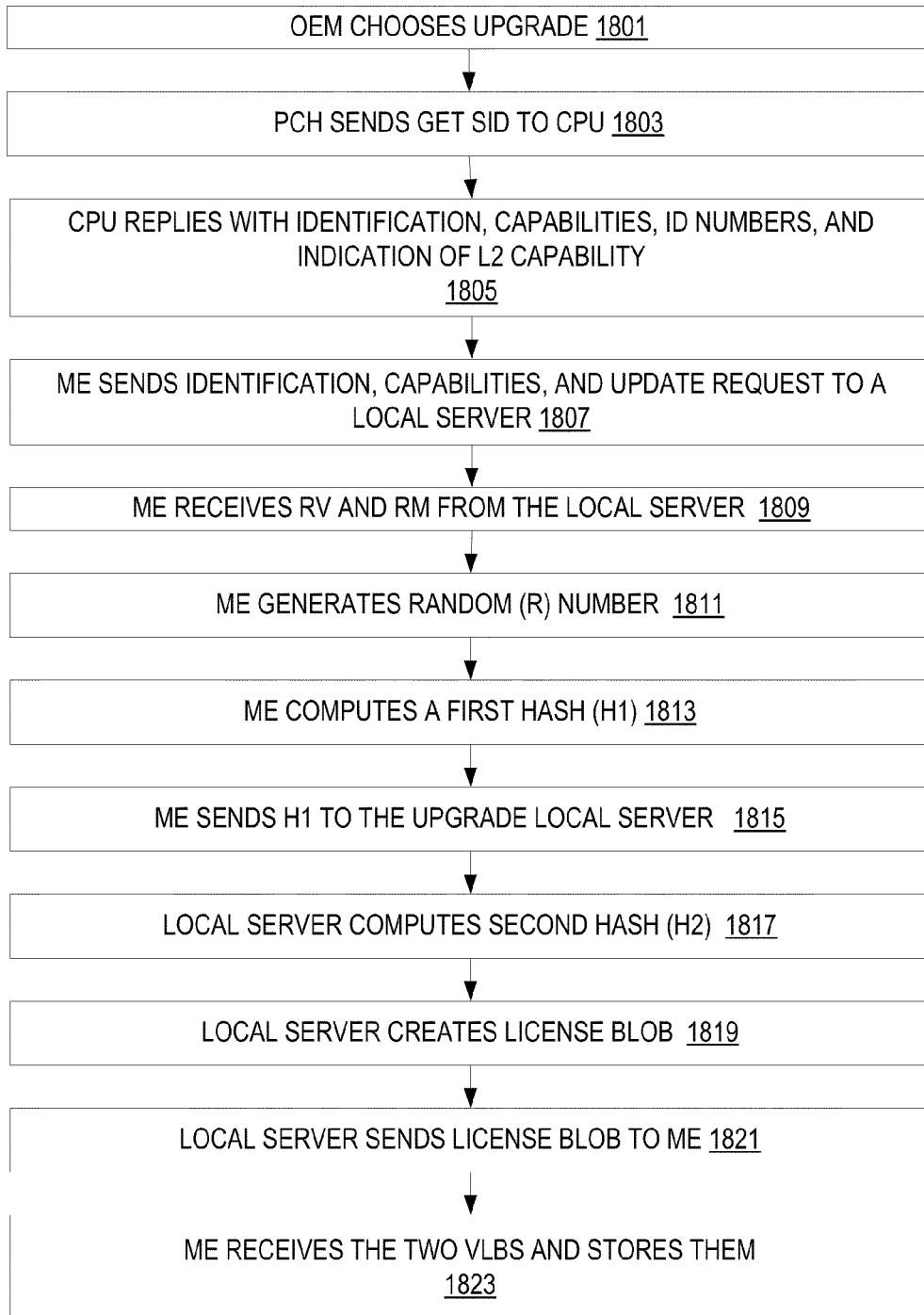
FIG. 18 illustrates an embodiment of a flow for the generation of license blobs by an OEM.

FIG. 18 illustrates an embodiment of a flow for the generation of license blobs by an OEM. At 1801, the OEM chooses an upgrade from a list of upgrade possibilities for the CPU 810 and platform 850. This list may be presented to the user through an application that displays what the current and upgrade capabilities of the CPU 810 and platform 850.

As a part of a handshaking process, the PCH 822 sends a "GET SID" request to the CPU 810 to ask for the identification of the CPU, its capabilities and identification numbers at 1803. The CPU 810 responds with the requested information at 1805. In an embodiment, the contents of the PINFO.ID register, PINFO.CP register, PINFO.UG (upgrade information), two identification numbers, and an indication of L2 capability comprise the requested information. The CPU response may also include an update request for the ME 824 to process.

The CPU identification and capabilities are sent to a local server from the ME 824 at 1807. The ME 824 also sends an update request on behalf of the user to the local server asking for a particular upgrade to be allowed.

The local server responds to the update request of the ME 822 at 1809 by sending RV and RM information to the ME. This RM and RV information may then later be used on a subsequent reset to update the CPU as described earlier.

The ME 824 generates a random number (R) at 1811. This random number ties the permit to the particular PCH 822 that made the update request. In an embodiment, R is a 64-bit number. The ME 824 then computes a first hash (H1) that includes two identification numbers (which are manufacturing IDs and tie the permit to the CPU that made the request), and R at 1813. In an embodiment, H1 is a SHA-256 hash and any remaining bits that are not occupied by the identification numbers and R before hashing are padded with 1s.

The ME 824 sends H1 to the local server at 1815. The local server computes a second hash (H2) that includes H1, the PINFO.ID and PINFO.CP information described above, a RM, and a RV. In an embodiment, both PINFO.ID and PINFO.CP are 32-bit values and the RM and RV are 128-bit values. The lower 32 bits of both RM and RV for dynamic fusing are reset to 0. In an embodiment, H2 is a SHA-256 hash and any remaining bits that are not occupied by H1, PINFO.ID, PINFO.CP, RM, and RV are padded with 1s.

The local server then produces an encrypted (signed) local blob at 1819. In an embodiment, the local blob has a 64-byte body comprised of H2 padded with 256 bits of 1s. The server signs the local blob with a private key (e.g., a 2048-bit private key). A 2048-bit public key modulus is also included in the local blob and its hash (e.g., a SHA-256 hash) is stored in the CPU cores. This is sent to the ME 824 at 1821.

The ME 824 stores the permit and local blob along with R in its non-volatile storage at 1823.

Permit Exchange

Permit exchanges refer to revoking/refunding one permit and replacing it with a different permit. The different permit may be an upgrade or a downgrade. However, in some embodiments, multiple permits will not be stored by the platform and when the first permit is revoked it is deleted and the new permit is stored in its place. A few examples of permit exchange scenarios are: a permit is issued with upgrades and at a later date even more upgrades are purchased; a customer was not happy with a second requested upgrade, was issued a refund, and the permit was replaced with a downgrade; and a OEM upgraded CPU gets upgraded and the OEM permit and its two VLBs are removed and a new permit with a single VLB is its replacement.

In order to ensure that an exchanged license is applied to the same CPU, the random number R cannot change from the one generated at the time the original permit was issued. This is because the CPU's identification number was hashed with a random number R before transmitting to the license server. Thus, H1 stays the same across exchanges.

Figure 19:
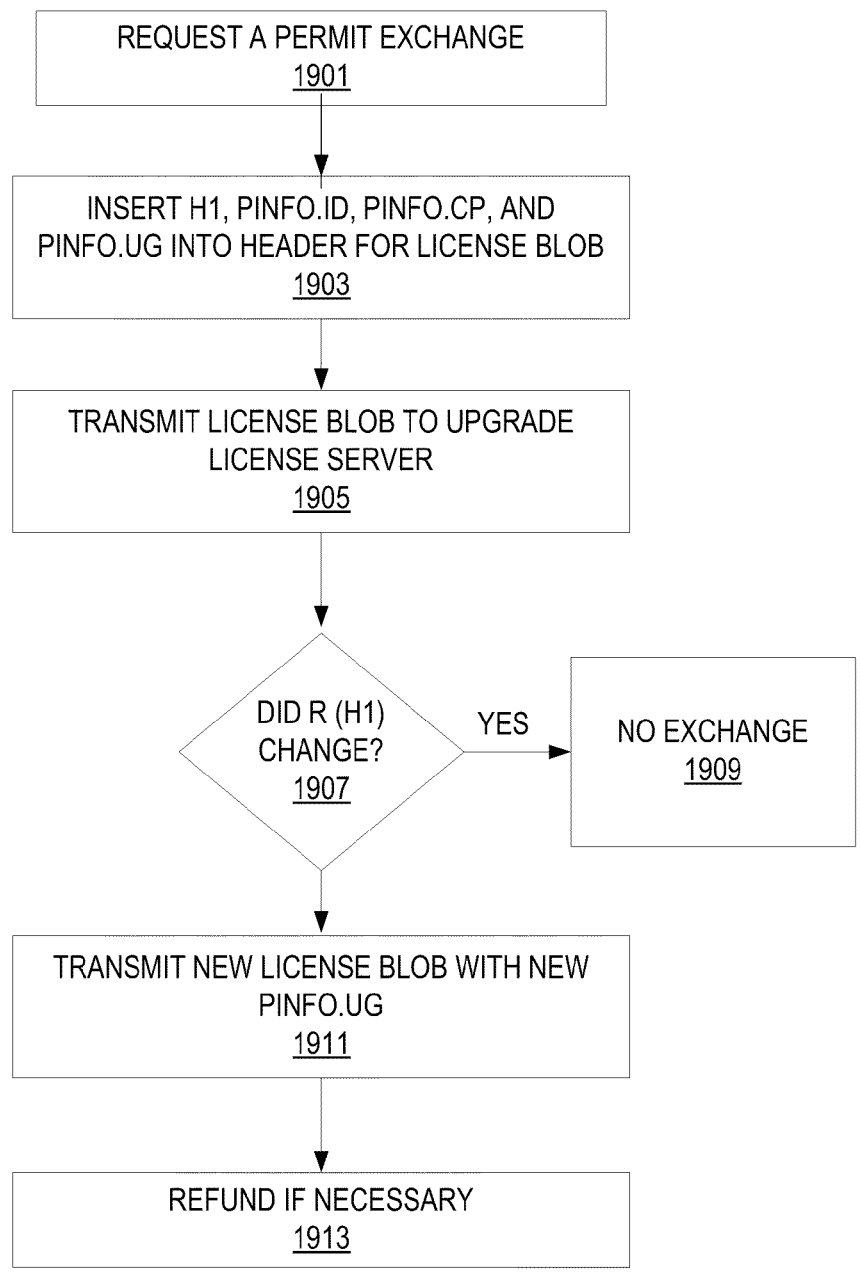
FIG. 19 illustrates an embodiment of a flow for permit exchange.

FIG. 19 illustrates an embodiment of a flow for permit exchange. At 1901 a request is made for a permit exchange. H1, PINFO.ID, PINFO.CP and PINFO.UG are inserted into the header of the VLB at 1903. This VLB is transmitted to a license server at 1905. The license server determines if R (in H1) has changed from what it has on record for this CPU at 1907. If R has changed, then no exchange will be made at 1909. If R is constant, then the same H1, PINFO.ID, PINFO.CP, and a new PINFO.UG are inserted into the header of a new VLB and the new VLB is transmitted from the license server to the PCH that made the request at 1911. Additionally, if necessary a refund is processed at 1913.

General Information

In some embodiments, the ME 824 performs a global reset. These cases may include: no authentication response; authentication failure; a new permit is obtained; and after three attempts of unsuccessfully trying to apply a new permit (where the user may perform warm/cold resets), the ME will afterwards perform a cold reset and revert the permit.

In some embodiments there are three reset choices: host reset without power cycle (platform reset/warm reset/soft reset); host reset with power cycle (cold reset/hard reset; and global reset (all power cycled).

While in the above description, the ME, PCH, PCU, CPU, etc. are described as performing one or more actions, in some embodiments other parts of the chipset, CPU complex, or CPU perform those actions. For example, it would be fair to say that the chipset performs actions described above as being performed by the ME and PCH.

Figure 20:
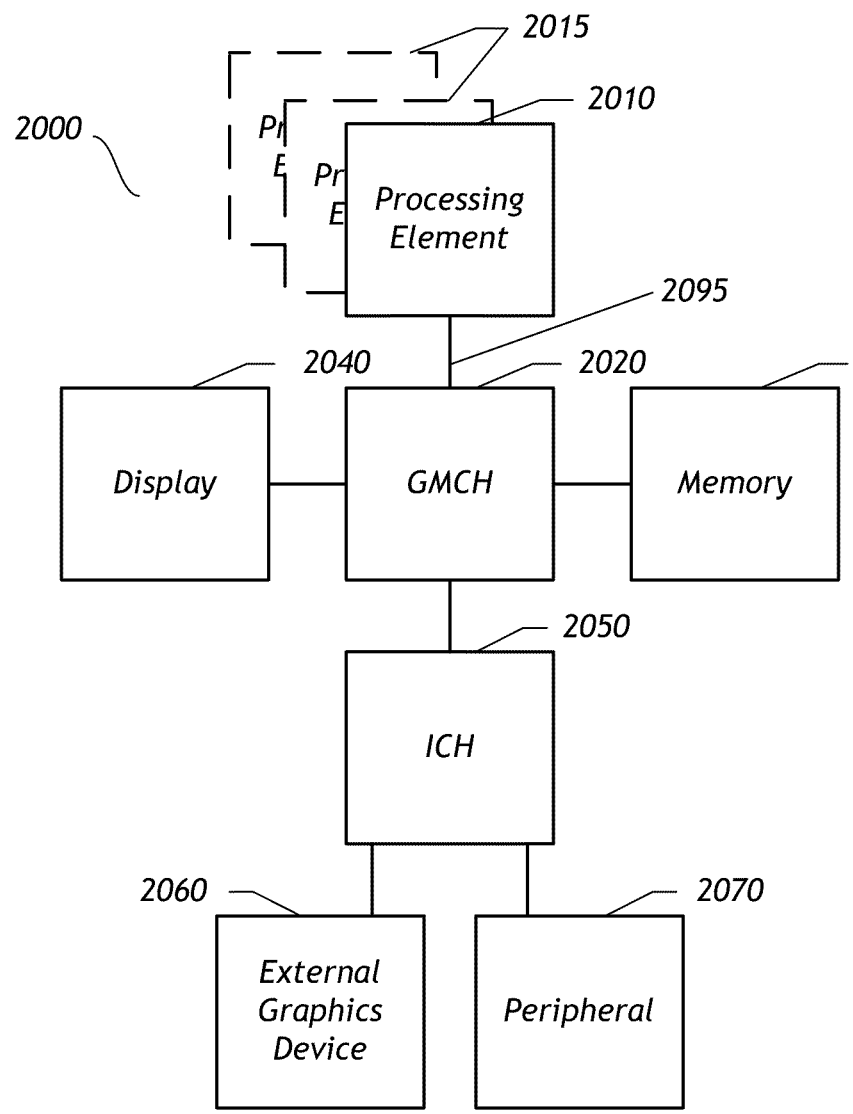
FIG. 20 illustrates a block diagram of a system in accordance with one embodiment of the present invention.

Referring now to FIG. 20, shown is a block diagram of a system in accordance with one embodiment of the present invention. The system 2000 may include one or more processing elements 2010, 2015, which are coupled to graphics memory controller hub (GMCH) 2020. The optional nature of additional processing elements 2015 is denoted in FIG. 20 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multi-threaded in that they may include more than one hardware thread context per core.

FIG. 20 illustrates that the GMCH 2020 may be coupled to a memory 2040 that may be, for example, a dynamic random access memory (DRAM). The DRAM may, for at least one embodiment, be associated with a non-volatile cache.

The GMCH 2020 may be a chipset, or a portion of a chipset. The GMCH 2020 may communicate with the processor(s) 2010, 2015 and control interaction between the processor(s) 2010, 2015 and memory 2040. The GMCH 2020 may also act as an accelerated bus interface between the processor(s) 2010, 2015 and other elements of the system 2000. For at least one embodiment, the GMCH 2020 communicates with the processor(s) 2010, 2015 via a multi-drop bus, such as a frontside bus (FSB) 2095.

Furthermore, GMCH 2020 is coupled to a display 2040 (such as a flat panel display). GMCH 2020 may include an integrated graphics accelerator. GMCH 2020 is further coupled to an input/output (I/O) controller hub (ICH) 2050, which may be used to couple various peripheral devices to system 2000. Shown for example in the embodiment of FIG. 20 is an external graphics device 2060, which may be a discrete graphics device coupled to ICH 2050, along with another peripheral device 2070.

Alternatively, additional or different processing elements may also be present in the system 2000. For example, additional processing element(s) 2015 may include additional processors(s) that are the same as processor 2010, additional processor(s) that are heterogeneous or asymmetric to processor 2010, accelerators (such as, e.g., graphics accelerators or digital signal processing (DSP) units), field programmable gate arrays, or any other processing element. There can be a variety of differences between the physical resources 2010, 2015 in terms of a spectrum of metrics of merit including architectural, microarchitectural, thermal, power consumption characteristics, and the like. These differences may effectively manifest themselves as asymmetry and heterogeneity amongst the processing elements 2010, 2015. For at least one embodiment, the various processing elements 2010, 2015 may reside in the same die package.

Figure 21:
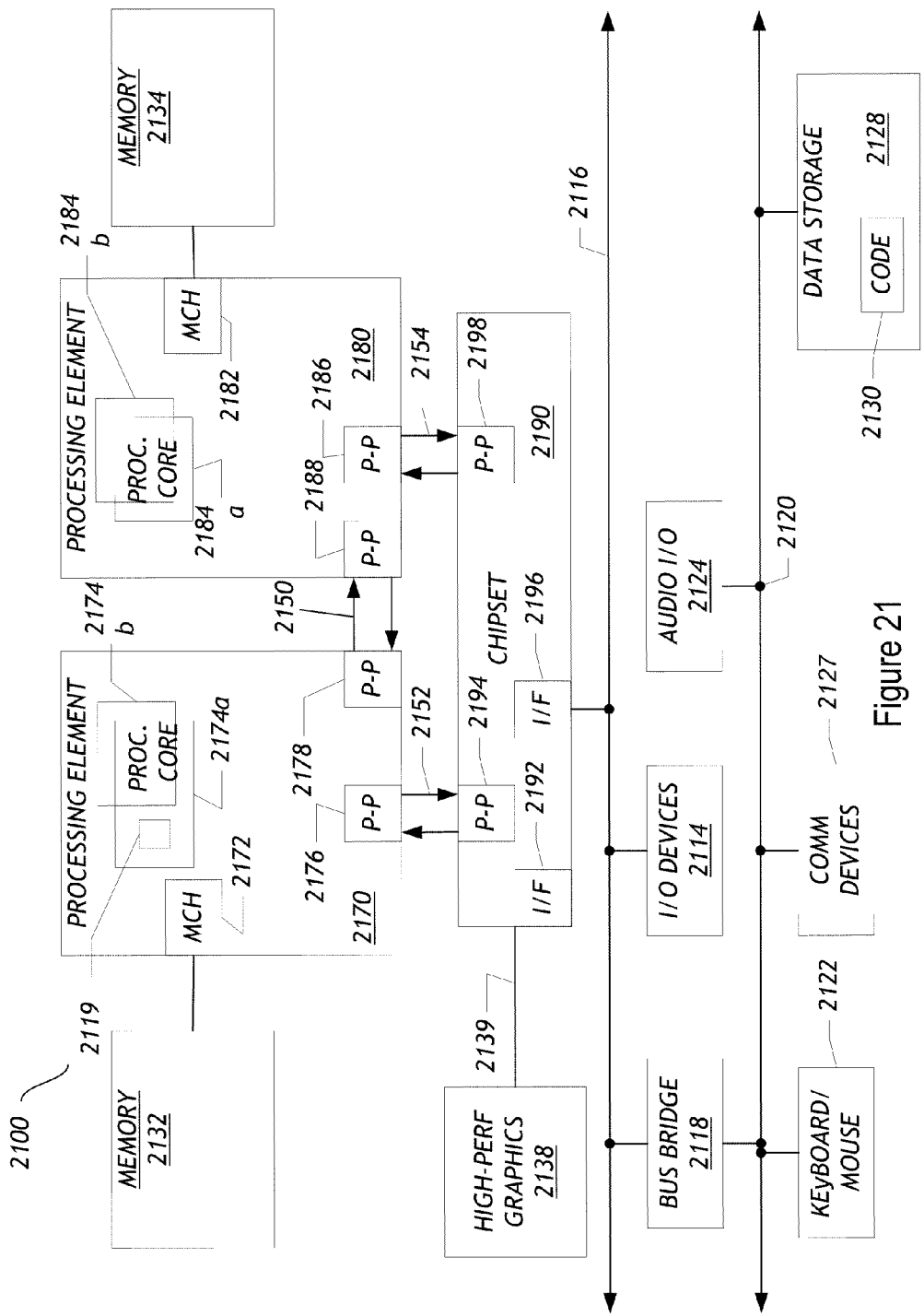
FIG. 21 illustrates a block diagram of a system in accordance with one embodiment of the present invention.

Referring now to FIG. 21, shown is a block diagram of a second system 2100 in accordance with an embodiment of the present invention. As shown in FIG. 21, multiprocessor system 2100 is a point-to-point interconnect system, and includes a first processing element 2170 and a second processing element 2180 coupled via a point-to-point interconnect 2150. As shown in FIG. 21, each of processing elements 2170 and 2180 may be multicore processors, including first and second processor cores (i.e., processor cores 2174a and 2174b and processor cores 2184a and 2184b).

Alternatively, one or more of processing elements 2170, 2180 may be an element other than a processor, such as an accelerator or a field programmable gate array.

While shown with only two processing elements 2170, 2180, it is to be understood that the scope of the present invention is not so limited. In other embodiments, one or more additional processing elements may be present in a given processor.

First processing element 2170 may further include a memory controller hub (MCH) 2172 and point-to-point (P-P) interfaces 2176 and 2178. Similarly, second processing element 2180 may include a MCH 2182 and P-P interfaces 2186 and 2188. Processors 2170, 2180 may exchange data via a point-to-point (PtP) interface 2150 using PtP interface circuits 2178, 2188. As shown in FIG. 21, MCH's 2172 and 2182 couple the processors to respective memories, namely a memory 2142 and a memory 2144, which may be portions of main memory locally attached to the respective processors.

Processors 2170, 2180 may each exchange data with a chipset 2190 via individual PtP interfaces 2152, 2154 using point to point interface circuits 2176, 2194, 2186, 2198. Chipset 2190 may also exchange data with a high-performance graphics circuit 2138 via a high-performance graphics interface 2139. Embodiments of the invention may be located within any processor having any number of processing cores, or within each of the PtP bus agents of FIG. 21. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode.

First processing element 2170 and second processing element 2180 may be coupled to a chipset 2190 via P-P interconnects 2176, 2186 and 2184, respectively. As shown in FIG. 21, chipset 2190 includes P-P interfaces 2194 and 2198. Furthermore, chipset 2190 includes an interface 2192 to couple chipset 2190 with a high performance graphics engine 2148. In one embodiment, bus 2149 may be used to couple graphics engine 2148 to chipset 2190. Alternately, a point-to-point interconnect 2149 may couple these components.

In turn, chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of the present invention is not so limited.

As shown in FIG. 21, various I/O devices 2114 may be coupled to first bus 2116, along with a bus bridge 2118 which couples first bus 2116 to a second bus 2120. In one embodiment, second bus 2120 may be a low pin count (LPC) bus. Various devices may be coupled to second bus 2120 including, for example, a keyboard/mouse 2122, communication devices 2126 and a data storage unit 2128 such as a disk drive or other mass storage device which may include code 2130, in one embodiment. Further, an audio I/O 2124 may be coupled to second bus 2120. Note that other architectures are possible. For example, instead of the point-to-point architecture of FIG. 21, a system may implement a multi-drop bus or other such architecture.

Figure 22:
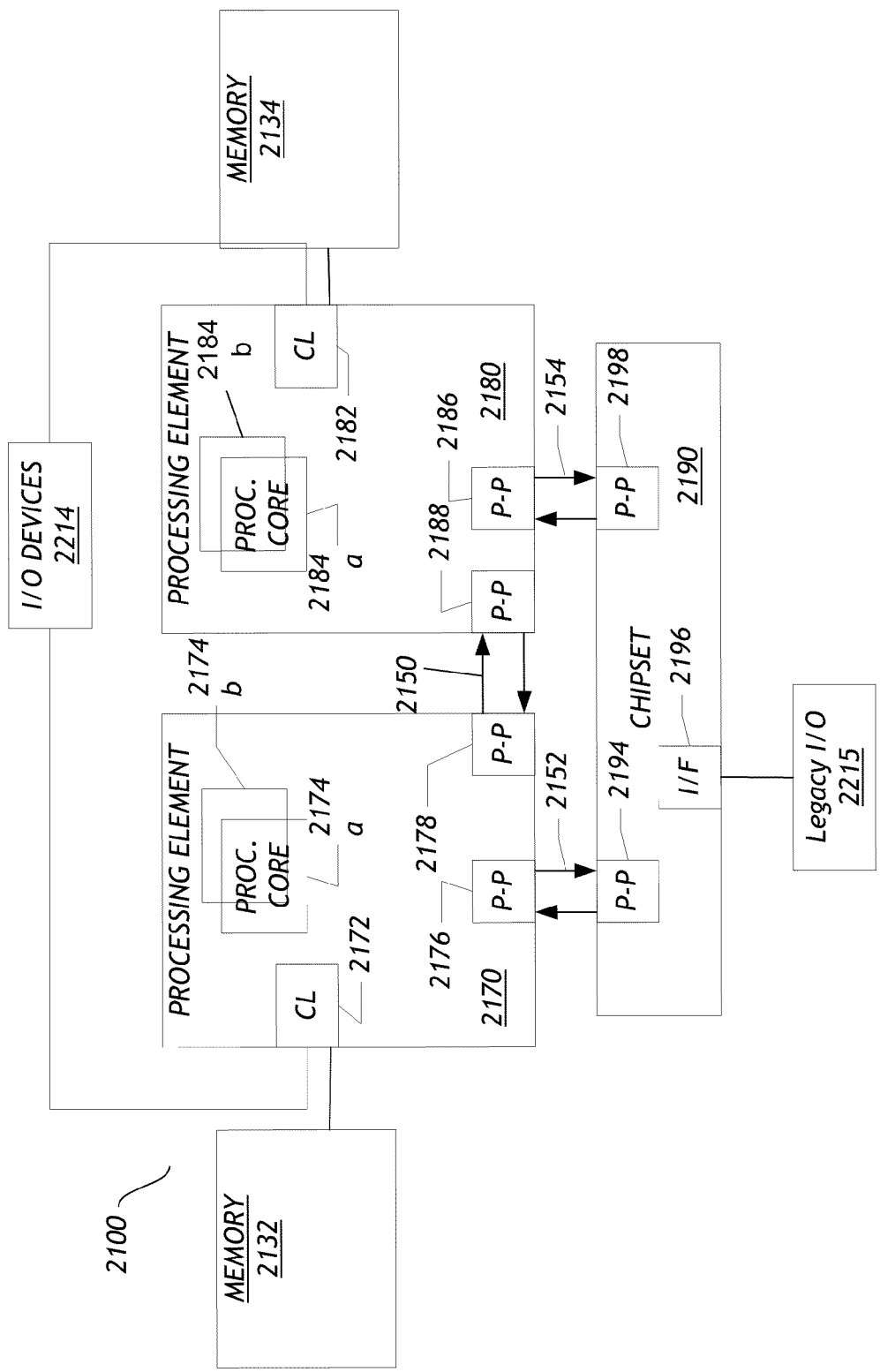
FIG. 22 illustrates a block diagram of a system in accordance with one embodiment of the present invention.

Referring now to FIG. 22, shown is a block diagram of a third system 2200 in accordance with an embodiment of the present invention. Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processing elements 2170, 2180 may include integrated memory and I/O control logic ("CL") 2172 and 2182, respectively. For at least one embodiment, the CL 2172, 2182 may include memory controller hub logic (MCH) such as that described above in connection with FIGS. 20 and 21. In addition. CL 2172, 2182 may also include I/O control logic. FIG. 22 illustrates that not only are the memories 2142, 2144 coupled to the CL 2172, 2182, but also that I/O devices 2214 are also coupled to the control logic 2172, 2182. Legacy I/O devices 2215 are coupled to the chipset 2190.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code, such as code 2130 illustrated in FIG. 21, may be applied to input data to perform the functions described herein and generate output information. Accordingly, embodiments of the invention also include machine-readable media containing instructions for performing the operations embodiments of the invention or containing design data, such as HDL, which defines structures, circuits, apparatuses, processors and/or system features described herein. Such embodiments may also be referred to as program products.

Such machine-readable storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents.

What is claimed is:

1. A method to upgrade a hardware device comprising:
   receiving a configuration message that indicates that the hardware device is to be upgraded from a first configuration to a second configuration, wherein the first and second configurations were pre-determined based on previous testing of the hardware device and are stored in the hardware device;
   receiving a permit to authorize the second configuration from an authentication authority;
   storing the permit in a secure non-volatile memory, wherein the secure non-volatile memory is not accessible by an operating system of the hardware device;
   determining that an expiry and time of the permit allow for a reconfiguration to the second configuration;
   programming a reconfiguration register of a central processing unit (CPU) using a management module that is outside of the CPU, wherein the CPU has only read access to the reconfiguration register;
   verifying that information in the reconfiguration register matches information of the configuration message; and
   configuring the hardware device to the second configuration based on settings of the reconfiguration register.

2. The method of claim 1, wherein the first and second configurations are fused into the hardware device.

3. The method of claim 2, wherein configuring the hardware device comprises:
   switching between the two fused configurations.

4. The method of claim 1, further comprising:
   determining that the permit is present in the secure non-volatile memory and valid prior to configuring the hardware device to the second configuration.

5. The method of claim 1, wherein the first configuration defines a first set of available performance states (P-states) of the hardware device and the second configuration defines a second set of available P-states, wherein the second set of P-states is an upgrade from the first set.

6. The method of claim 1, wherein the hardware device is a central processing unit (CPU).

7. A system comprising:
   a central processing unit (CPU) to receive a configuration message that indicates that the CPU is to be upgraded from a first configuration to a second configuration, wherein the first and second configurations were pre-determined based on previous testing of the CPU and are stored in the CPU, wherein the CPU further includes a reconfiguration register to store configuration settings from the configuration message and the configuration message as expiry and time; and
   a management module, coupled to the CPU, to determine that the system is authorized to configure the at least one configurable feature of the CPU and send the configuration message to the CPU, wherein the management module to provide the configuration message to the CPU over a point-to-point interconnect and the configuration message is a vendor defined message (VDM) and to verify that information in the configuration register matches information of the configuration message; and
   a secure non-volatile memory to receive and store a permit to authorize the configuration from an authentication authority, wherein the secure non-volatile memory is not accessible by an operating system of the system.

8. The system of claim 7, wherein the first and second configurations are fused into the CPU.

9. The system of claim 7, wherein the system further comprises a non-volatile memory to store a permit to authorize the configuration from an authentication authority.

10. The system of claim 7, wherein the management module comprises a non-volatile memory to store a permit to authorize the configuration from an authentication authority.

11. The system of claim 7, wherein the CPU to parse the received configuration message to obtain the configuration settings and switch between the configurations.

12. A central processing unit (CPU) comprising:
    a plurality of processing cores;
    a first pre-determined configuration of the processing cores based on previous testing of the CPU; and
    a second pre-determined configuration of the processing cores based on previous testing of the CPU, wherein the CPU to receive a configuration message that indicates that the CPU is to be upgraded from the first configuration to the second configuration, wherein the configuration message is a vendor defined message (VDM), wherein the CPU further includes a reconfiguration register to store configuration settings from the configuration message and the configuration message as expiry and time, wherein the CPU to access a secure non-volatile memory to receive and store a permit to authorize the pre-determined configurations from an authentication authority, wherein the secure non-volatile memory is not accessible by an operating system to execute on the CPU.

13. The CPU of claim 12, wherein the first and second configurations are fused into the CPU.

14. The CPU of claim 12, wherein the CPU to parse the received configuration message to obtain the configuration settings and switch between the configurations.

15. The method of claim 1, wherein a logical exclusive OR (XOR) operation is performed on the contents in the CPU reconfiguration register with the contents of a CPU fuse block to perform the configuring.

* * * * *